(12) United States Patent
Oikawa et al.

(10) Patent No.: US 6,907,154 B2
(45) Date of Patent: Jun. 14, 2005

(54) OPTICAL SWITCH HAVING SWITCH CELLS WITH MOVABLE SWITCH MIRRORS

(75) Inventors: Yoichi Oikawa, Sapporo (JP); Satoshi Kuroyanagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 239 days.

(21) Appl. No.: 09/924,606

(22) Filed: Aug. 9, 2001

(65) Prior Publication Data

US 2002/0164109 A1 Nov. 7, 2002

(30) Foreign Application Priority Data

Mar. 2, 2001 (JP) ........................................ 2001-059089

(51) Int. Cl.$^7$ .............................. G02B 6/26; G02B 6/42
(52) U.S. Cl. ...................................................... 385/17
(58) Field of Search ............................. 385/17, 18, 25, 385/33, 34, 35, 47; 250/221

(56) References Cited

U.S. PATENT DOCUMENTS

| | | | | |
|---|---|---|---|---|
| 4,837,855 | A | 6/1989 | Hajikano et al. | 455/600 |
| 6,212,309 | B1 | 4/2001 | Nguyen et al. | 385/17 |
| 6,466,711 | B1 * | 10/2002 | Laor et al. | 385/18 |
| 6,473,544 | B1 * | 10/2002 | Daneman et al. | 385/17 |
| 6,694,073 | B2 * | 2/2004 | Golub et al. | 385/18 |
| 2001/0024541 | A1 * | 9/2001 | Okayama et al. | 385/17 |
| 2002/0071627 | A1 * | 6/2002 | Smith et al. | 385/15 |
| 2002/0071628 | A1 * | 6/2002 | Zang et al. | 385/17 |

FOREIGN PATENT DOCUMENTS

JP          53-80904          7/1978

OTHER PUBLICATIONS

L.Y. Lin et al. "Free–Space Micromachined Optical Switches with Submillisecond Switching Time for Large–Scale Optical Crossconnects." IEEE Photonics Technology Letters. vol. 10. No. 4. Apr. 1998. pp. 525–527.

* cited by examiner

Primary Examiner—Chandrika Prasad
(74) Attorney, Agent, or Firm—Staas & Halsey LLP

(57) ABSTRACT

An optical switch having a plurality of switch cells. The optical switch has n inputs (n is a natural number) and m outputs (m is a natural number). The optical switch has a unit size defined as the distance between any two adjacent ones of the switch cells. The optical switch comprises a substrate having a switch size of K×L (K is an integer satisfying $n \leq K$, and L is an integer satisfying $m \leq L$), first and second mirrors parallel to each other and perpendicular to a principal surface of the substrate, and an optical unit providing a plurality of input optical paths for the n inputs and a plurality of output optical paths for the m outputs. The plurality of input optical paths are inclined relative to the first and second mirrors, and the plurality of output optical paths are inclined relative to the first and second mirrors. Each switch cell comprises a switch mirror provided movably relative to the substrate. With this configuration, the path dependence of loss is substantially eliminated.

10 Claims, 51 Drawing Sheets

◒ ; SWITCH CELL (ON STATE; MIRROR INSERTED)

◯ ; SWITCH CELL (OFF STATE; MIRROR NOT INSERTED)

SIZE;3 x 3
OPTICAL PATH LENGTH ;3
NUMBER OF REFLECTIONS;2/4/0
KINDS OF MIRRORS;UPWARD REFLECTIN;4
            DOWNWARD REFLECTION;4
            BIDIRECTIONAL REFLECTION;1
NUMBER OFCELLS;9

3 x 3 OPTICAL SWITCH

SIZE;2 x 2
OPTICAL PATH LENGTH ;2NUMBER OF
REFLECTIONS;2/1
KINDS OF MIRRORS;UPWARD REFLECTIN;2
            DOWNWARD REFLECTION;2
NUMBER OFCELLS;4

2 x 2 OPTICAL SWITCH

NUMBER OF SWITCH CELLIS;

UPWARD REFLECTION; n+1
DOWNWARD REFLECTION; n+1
BIDIRECTIONAL REFLECTION; $n^2-2n-2$
TOTAL NUMBER; $n^2$

ANGLE OF INCIDENCE; 30°

$$d = a \cdot \tan \theta i$$
$$dm = 1/2 \cdot a \cdot \tan \theta i$$

⊗ SIMULTANEOUS BIDIRECTIONAL REFLECTION MIRROR

FIG.26
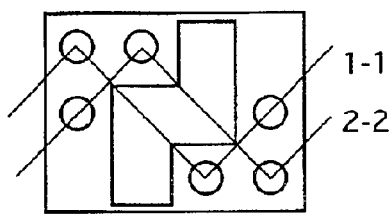
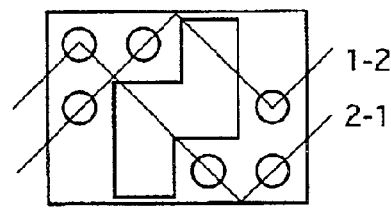
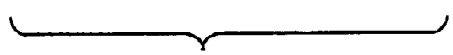
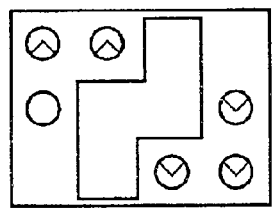

ⓘₙ : UPWARD REFLECTION SWITCH CELL FOR CONNECTING INPUT CHANNEL #i TO OUTPUT CHANNEL #n 2 x 2 OPTICAL SWITCH
    SIZE; 3 x 3
    OPTICAL PATH LENGTH; 3
    NUMBER OF CELLS; 6
    NUMBER OF UPWARD REFLECTION MIRRORS; 4
    NUMBER OF DOWNWARD REFLECTION MIRRORS; 2
    NUMBER OF REFLECTIONS ; ALWAYS 2

FIG.44
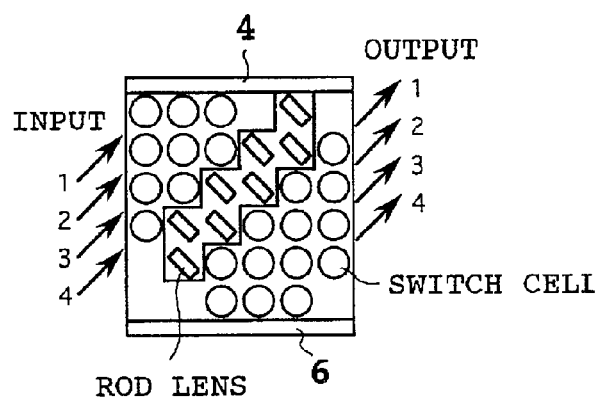
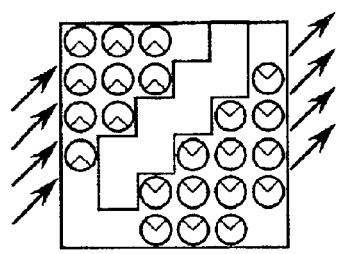

FIG.45
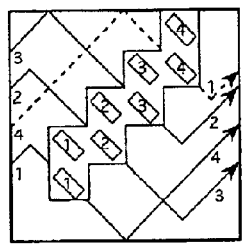
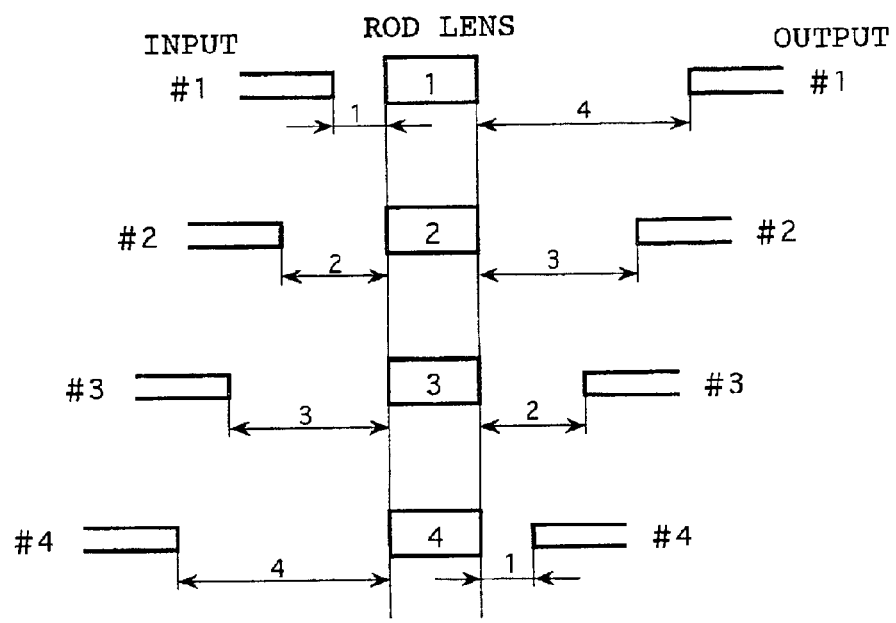

FIG.48

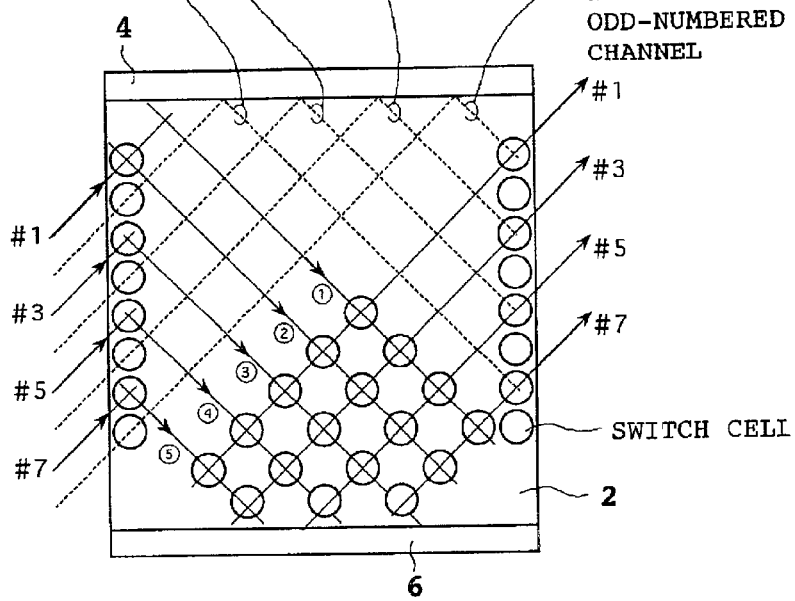

DEDICATED ROUTE FROM INPUT CHANNEL #2 TO ODD-NUMBERED OUTPUT CHANNEL

DEDICATED ROUTE FROM INPUT CHANNEL #4 TO ODD-NUMBERED OUTPUT CHANNEL

DEDICATED ROUTE FROM INPUT CHANNEL #6 TO ODD-NUMBERED OUTPUT CHANNEL

DEDICATED ROUTE FROM INPUT CHANNEL #8 TO ODD-NUMBERED OUTPUT CHANNEL

SWITCH CELL

①, ② : ROUTES TO OUTPUT CHANNELS #1, #3, #5, AND #7

③ : ROUTES TO OUTPUT CHANNELS #1, #3, #5 AND #7 WHEN INPUT CHANNEL IS #3, #5, OR #7

④ : ROUTES TO OUTPUT CHANNELS #1, #3, AND #5

⑤ : ROUTES TO OUTPUT CHANNELS #1 AND #3

| INPUT CHANEL | ROUTE TO ODD-NUMBERED OUTPUT CHANNEL |
|---|---|
| 1 | ①/② |
| 3 | ①/② ,③ |
| 5 | ①/② ,③,④ |
| 7 | ①/② ,③,④,⑤ |

| INPUT CHANNEL | OUTPUT CHANNEL | ROUTE |
|---|---|---|
| 1 → | 1 | ① or ② |
| 3 → | 3 | ③ |
| 5 → | 5 | ④ |
| 7 → | 7 | ① or ② |

NUMBER OF UPWARD REFLECTION SWITCH CELLS : $\sum_{m=1}^{n} m - 1 + \frac{n}{4} \times n = \frac{n(n+1)}{2} - 1 + \frac{n^2}{4} = \frac{3}{4}n^2 + \frac{1}{2}n - 1$ NUMBER OF DOWNWARD REFLECTION SWITCH CELLS : $2 \cdot \sum_{m=1}^{n/2} m + \frac{n}{4} \times \frac{n}{2} + (\frac{n}{4} - 1) \times \frac{n}{2} = \frac{n^2}{2}$ ○ SHOWN IN LEFT UPER PORTION OF THE FIGURE
□ SHOWN IN THE FIGURE
△ SHOWN IN THE FIGURE NUMBER OF ALL SWITCH CELLS : $\frac{5}{4}n^2 + \frac{1}{2}n - 1$

OPTICAL SWITCH HAVING SWITCH CELLS WITH MOVABLE SWITCH MIRRORS

BACKGROUND OF THE INVENTION

1. Field of the Invention

The present invention relates to an optical switch, and more particularly to an optical switch suitable for a node in a photonic network using wavelength division multiplexing (WDM).

2. Description of the Related Art

The development and commercialization of a wavelength division multiplexing (WDM) system are proceeding as a communication system that can greatly increase a transmission capacity. To construct a large-scale photonic network by connecting WDM systems, there has been examined a ring type network obtained by connecting nodes through optical fibers in the form of a loop.

In the ring type network, a transmission capacity in the loop increases with an increase in scale of the network. However, in each node, it is sufficient to perform processing using a relatively small-scale optical switch.

To the contrary, in a mesh type network, a transmission capacity in each route is small, but it is necessary to perform processing using a large-scale optical switch in each node.

Further, not only in the ring type network, but also in a point-to-point link system, an electrical switch is conventionally used to extract lower-order signals in the node. By substituting an optical switch for the electrical switch, a cost in the node can be reduced. Accordingly, the development of a large-scale optical network is proceeding in various types of networks.

A waveguide type optical switch is known as a conventional commercialized small-scale optical switch. The waveguide type optical switch includes a switch element and fiber arrays for inputs and outputs connected to the switch element.

To increase the scale of the switch element, the yield of each switch cell itself formed on the switch element must be increased. However, increasing the yield is relatively difficult because of narrow manufacturing tolerances. Further, loss is caused by a loss in each switch cell and losses at the connections between the input and output fibers and the switch element.

Accordingly, in increasing the scale of the waveguide type optical switch, it is necessary not only to improve the yield by improving the manufacturing method, but also to remarkably improve the performance of the switch element.

On the other hand, a configuration of spatially switching light is considered as a traditional technique. By using a reflection mirror as an element for changing an optical path, the problems in performance of the waveguide type optical switch, such as on/off ratio and crosstalk can be almost eliminated.

However, such a space switch is large in volume, and it is therefore difficult to increase the scale of the switch from the viewpoint of size.

To break through such circumstances, there has recently been developed a technique of reducing the size of this space switch by using a semiconductor technology. This technique is referred to as MEMS (Micro Electro Mechanical System), and it is also called optical MEMS in the case of application to the field of optics.

The optical switch using MEMS has a plurality of small mirrors formed on a substrate by a semiconductor fabrication technique, and performs switching of optical paths by selectively raising these mirrors by static electricity.

Information on MEMS may be provided by IEEE Photonic Technology Letters, Vol. 10, No. 4, APRIL 1998, pp. 525–527.

The optical switch using MEMS is superior in switch performance to a waveguide switch owing to the use of the mirrors, and has a small size like the waveguide switch. However, as will be hereinafter described, an optical path length differs according to a switching path, causing path dependence of loss. Further, when the optical path length increases with an enlargement in scale, an increase in loss due to beam spread also becomes a matter of concern because of spatial coupling.

SUMMARY OF THE INVENTION

It is therefore an object of the present invention to provide an optical switch which can be reduced in size.

It is another object of the present invention to provide an optical switch which can eliminate path dependence of loss.

Other objects of the present invention will become apparent from the following description.

In accordance with an aspect of the present invention, there is provided an optical switch having a plurality of switch cells. The optical switch has n inputs (n is a natural number) and m outputs (m is a natural number). The optical switch has a unit size defined as the distance between any two adjacent ones of the switch cells. The optical switch comprises a substrate having a switch size of K×L (K is an integer satisfying $n \leq K$, and L is an integer satisfying $m \leq L$), first and second mirrors parallel to each other and perpendicular to a principal surface of the substrate, and an optical unit providing a plurality of input optical paths for the n inputs and a plurality of output optical paths for the m outputs. The plurality of input optical paths are inclined relative to the first and second mirrors, and the plurality of output optical paths are inclined relative to the first and second mirrors. Each of the switch cells comprises a switch mirror provided movably relative to the substrate.

In accordance with another aspect of the present invention, there is provided an optical switch comprising a plurality of optical path switching means arranged so as to arbitrarily guide light from a plurality of input ports to a plurality of output ports, each of the plurality of optical path switching means having a movable optical reflecting member; and reflecting means for reflecting light from the input ports or light from the optical reflecting members toward the output ports or the optical reflecting members.

In accordance with another aspect of the present invention, there is provided an optical switch comprising a plurality of optical path switching means arranged so as to arbitrarily guide light from a plurality of input ports to a plurality of output ports, each of the plurality of optical path switching means having a movable optical reflecting member; all the optical path lengths from the input ports to the output ports being equal.

In accordance with another aspect of the present invention, there is provided an optical switch comprising a plurality of optical path switching means arranged so as to arbitrarily guide light from a plurality of input ports to a plurality of output ports, each of the plurality of optical path switching means having a movable optical reflecting member; all the optical losses from the input ports to the output ports being equal.

In accordance with another aspect of the present invention, there is provided an optical switch comprising a plurality of optical input ports; a plurality of optical output ports; a plurality of optical path switching means provided between the plurality of optical input ports and the plurality of optical output ports, each of the plurality of optical path switching means having a movable optical reflecting member; and reflecting means provided outside of the plurality of optical path switching means between the plurality of optical input ports and the plurality of optical output ports for reflecting light from the optical input ports or light from the optical path switching means.

In accordance with another aspect of the present invention, there is provided an optical switch comprising a plurality of optical input ports; a plurality of optical output ports; a plurality of optical path switching means provided between the plurality of optical input ports and the plurality of optical output ports, each of the plurality of optical path switching means having a movable optical reflecting member; and reflecting means provided between the plurality of optical input ports and the plurality of optical output ports so as to interpose the plurality of optical path switching means for reflecting light from the optical input ports or light from the optical path switching means.

In accordance with another aspect of the present invention, there is provided an optical switch comprising a plurality of optical input ports; a plurality of optical output ports; and a plurality of optical path switching means provided between the plurality of optical input ports and the plurality of optical output ports, each of the plurality of optical path switching means having a movable optical reflecting member; optical inputs from the optical input ports to adjacent ones of the optical path switching means crossing each other in direction.

In accordance with another aspect of the present invention, there is provided an optical switch comprising a plurality of optical input ports; a plurality of optical output ports; and a plurality of optical path switching means provided between the plurality of optical input ports and the plurality of optical output ports, each of the plurality of optical path switching means having a movable optical reflecting member; initial operational conditions of adjacent ones of the optical path switching means for receiving light from the optical input ports being reversed to each other.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 26 is a schematic view showing all, or two kinds of switching conditions of a 2×2 optical switch configured similarly to the optical switch shown in FIG. 22;

FIG. 44 is a schematic view for summarizing the conditions shown in FIGS. 42 and 43 to clarify the directions of reflections on the mirrors of the switch cells;

FIG. 45 is a schematic view for illustrating the kinds of the plural rod lenses;

FIG. 48 is a schematic view for illustrating the operation of the optical switch shown in FIG. 46;

DETAILED DESCRIPTION OF THE PREFERRED EMBODIMENTS

Some preferred embodiments of the present invention will now be described in detail with reference to the attached drawings.

Figure 1:
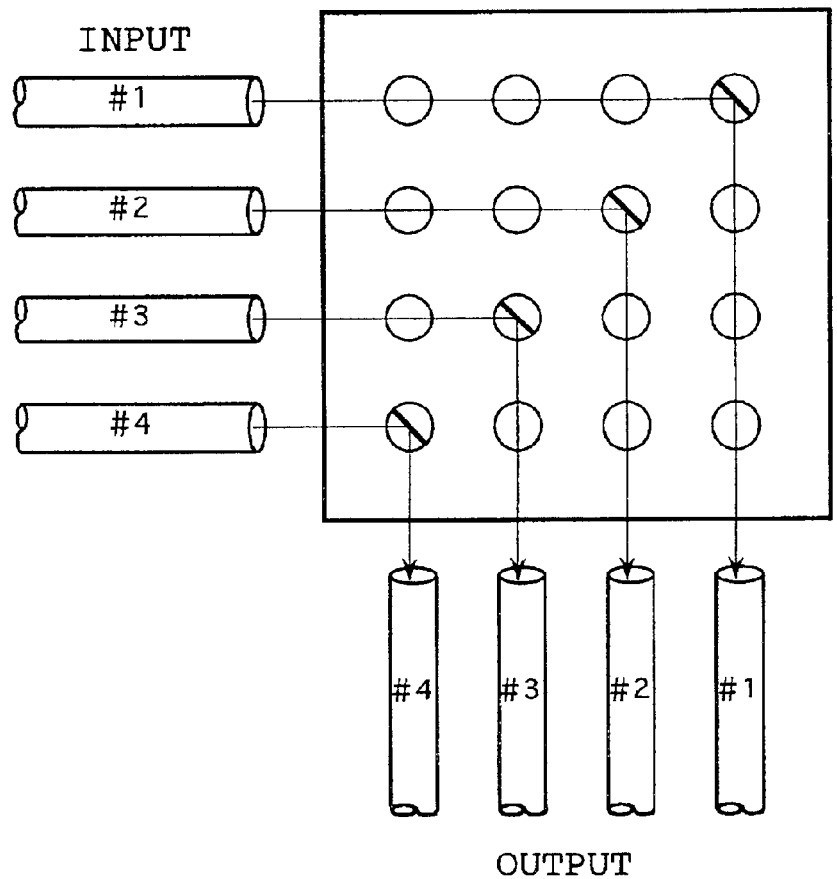
FIG. 1 is a schematic view showing a conventional optical switch using MEMS.

Referring to FIG. 1, there is shown a conventional optical switch using MEMS. This optical switch is configured so that four input channels #1 to #4 and four output channels #1 to #4 are arranged in orthogonal relationship with each other and 16 switch cells are arranged so as to optically couple any arbitrary one of the input channels #1 to #4 to any arbitrary one of the output channels #1 to #4. The switch cells are provided at 4×4 lattice positions.

Each switch cell can switch optical paths by forming a small mirror on a substrate by a semiconductor fabrication technique and driving this mirror by an electrostatic force. For example, each switch cell can switch between a first condition where the mirror is parallel to a principal surface (parallel to the sheet of FIG. 1) of the substrate and a second condition where the mirror is perpendicular to the principal surface.

This optical switch is superior in switch performance to an optical waveguide switch owing to the use of the mirrors, and can be reduced in size like the optical waveguide switch. However, as shown in FIG. 1, an optical path length differs according to a switching path, causing path dependence of loss. Further, when the optical path length increases with an enlargement in scale, an increase in loss due to beam spread also becomes a matter of concern because of spatial coupling.

Figure 2:
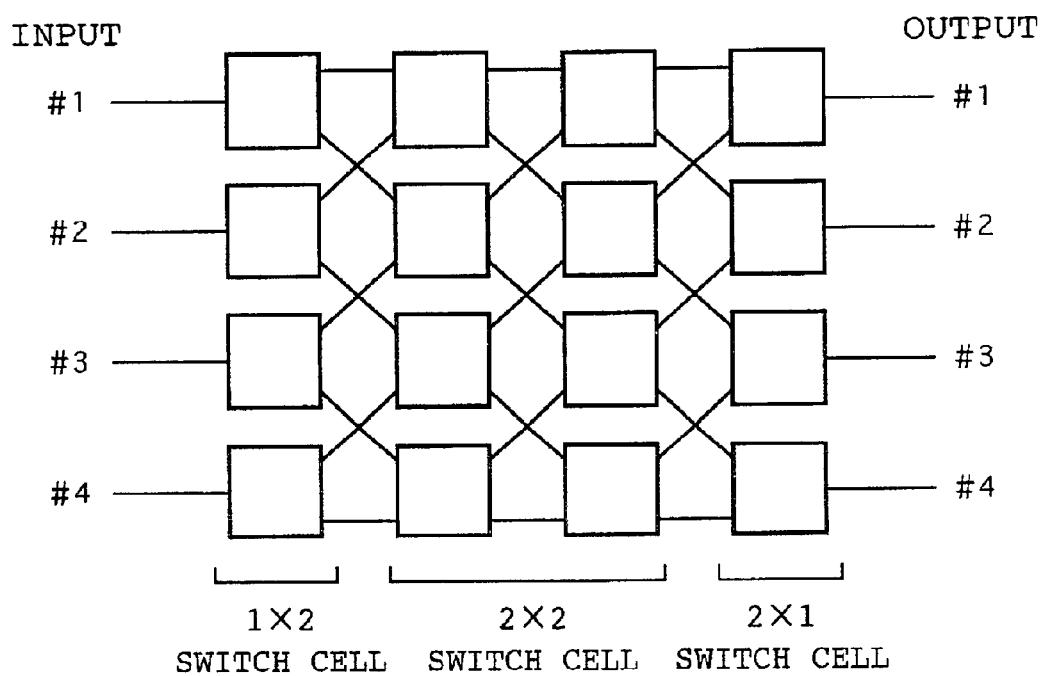
FIG. 2 is a schematic view showing a conventional path-independent optical switch.

Referring to FIG. 2, there is shown a conventional path-independent optical switch. This optical switch is configured so that four input channels #1 to #4 and four output channels #1 to #4 are arranged substantially parallel to each other and 16 switch cells are provided in the form of a matrix between these input and output channels. The 16 switch cells include four 1×2 switch cells, eight 2×2 switch cells, and four 2×1 switch cells. All of the switch cells may be formed simultaneously on a waveguide substrate.

In this optical switch, the loss between the input channels and the output channels is made independent of a path by properly connecting the switch cells.

In the optical switch shown in FIG. 1, each input channel and each output channel are optically coupled by one 90° reflection. Accordingly, the optical switch shown in FIG. 1 cannot obtain optical path setting as shown in FIG. 2 which can be relatively freely obtained in an optical waveguide. The path dependence of loss becomes fatal with an enlargement in scale of an optical switch. Therefore, in the optical switch using reflection type switch cells as shown in FIG. 1, it is earnestly desired to eliminate the path dependence of loss.

Figure 3:
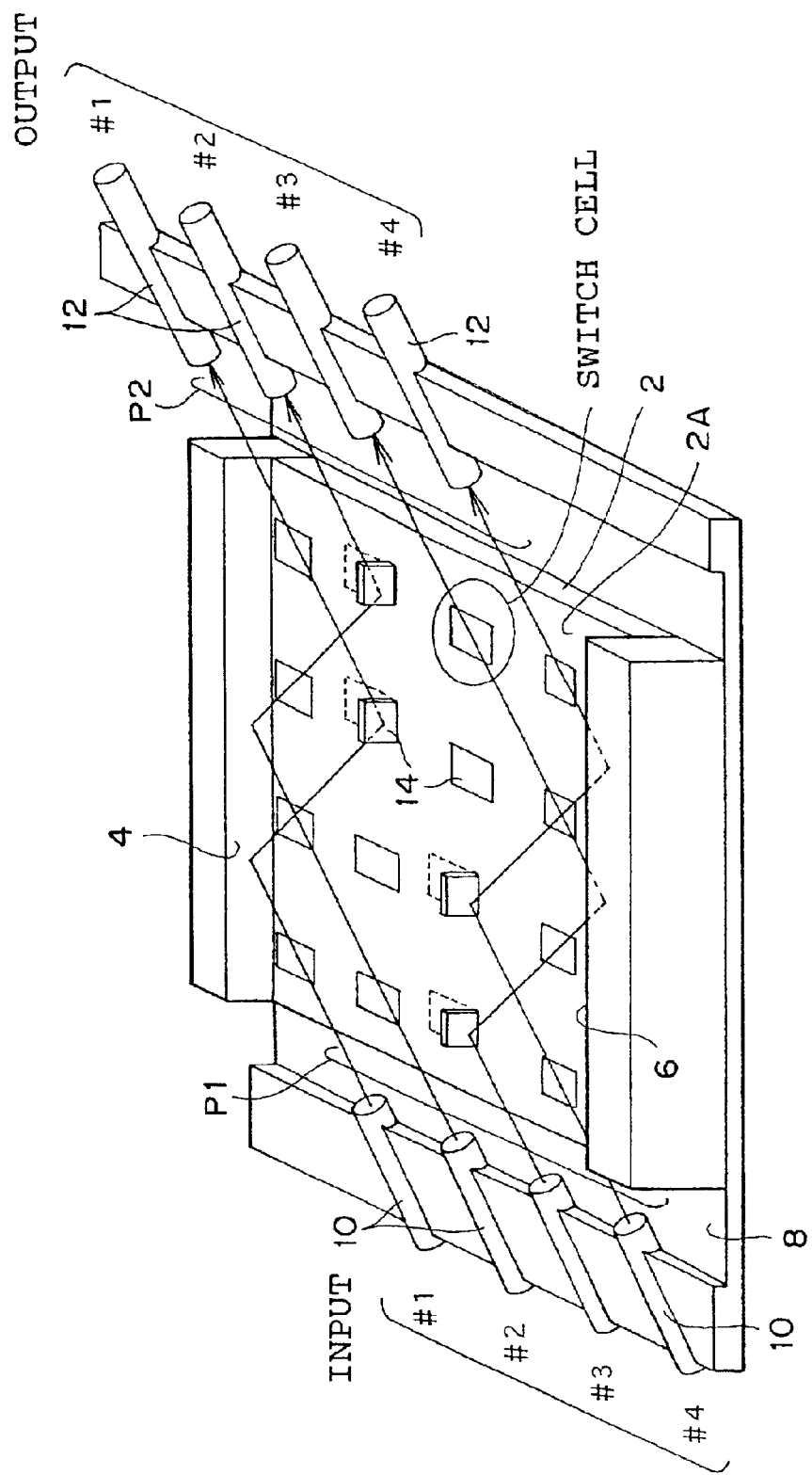
FIG. 3 is a perspective view showing a preferred embodiment of the optical switch according to the present invention.

FIG. 3 is a perspective view of an optical switch according to the present invention. This optical switch includes a substrate 2 integrally having 16 switch cells (optical path switching means) formed by MEMS, mirrors 4 and 6 parallel to each other and perpendicular to a principal surface 2A of the substrate 2, and an optical unit 8 providing input optical paths P1 for input channels (input ports) #1 to #4 and output optical paths P2 for output channels (output ports) #1 to #4.

The optical unit 8 includes optical fibers 10 provided so as to respectively correspond to the input channels #1 to #4 and optical fibers 12 provided so as to respectively correspond to the output channels #1 to #4. Collimating optical systems are formed by lenses (not shown) between the optical fibers 10 and the optical fibers 12. The optical fibers 10 are provided so that the input optical paths P1 are parallel to each other and inclined relative to the mirrors (reflecting means) 4 and 6. The optical fibers 12 are provided so that the output optical paths P2 are parallel to each other and inclined relative to the mirrors 4 and 6. In this preferred embodiment, the optical fibers 10 and 12 are parallel to each other on the same plane.

The switch cells are provided on the principal surface 2A of the substrate 2. Each switch cell includes a switch mirror 14 movable relative to the substrate 2, and can switch between a first condition where the switch mirror 14 is parallel to the principal surface 2A and a second condition where the switch mirror 14 is perpendicular to the principal surface 2A. In this preferred embodiment, each switch mirror 14 is parallel to the mirrors 4 and 6 in the second condition.

When the distance between any nearest two switch cells in this optical switch is defined as a unit size, the substrate 2 has a 4×4 switch size. The 16 switch cells are provided at 4×4 lattice positions. The substrate 2 may have a size larger than the switch size.

With this configuration, the optical path length can be made constant regardless of a switching path to eliminate variations in loss according to the path as understood from the examination of various optical paths to be hereinafter described.

Figure 4A:
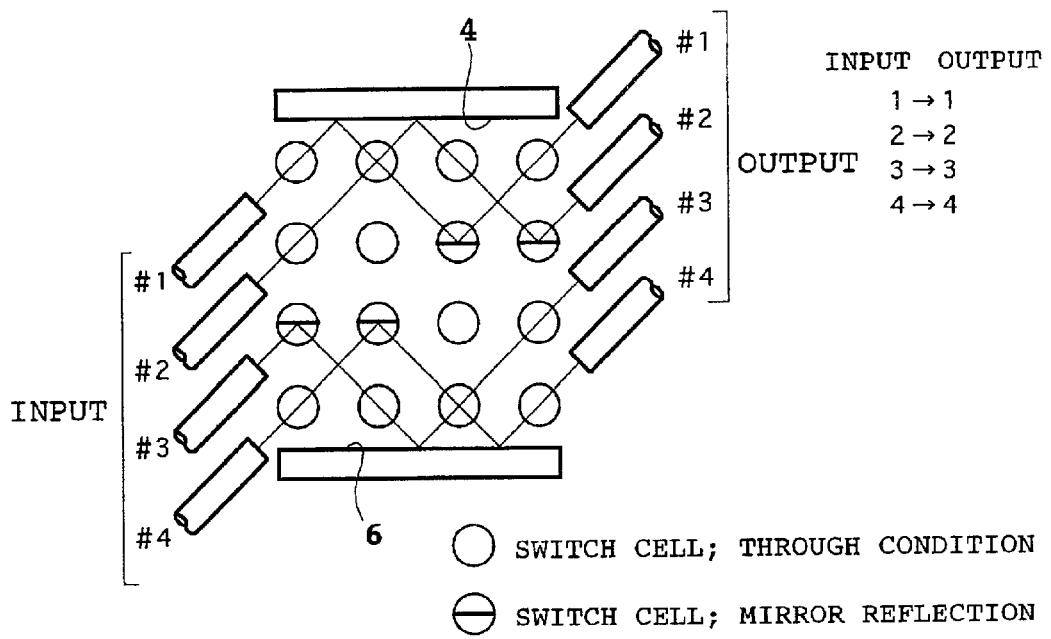
FIGS. 4A and 4B are schematic views showing examples of path setting in the optical switch shown in FIG. 3.
Figure 4B:
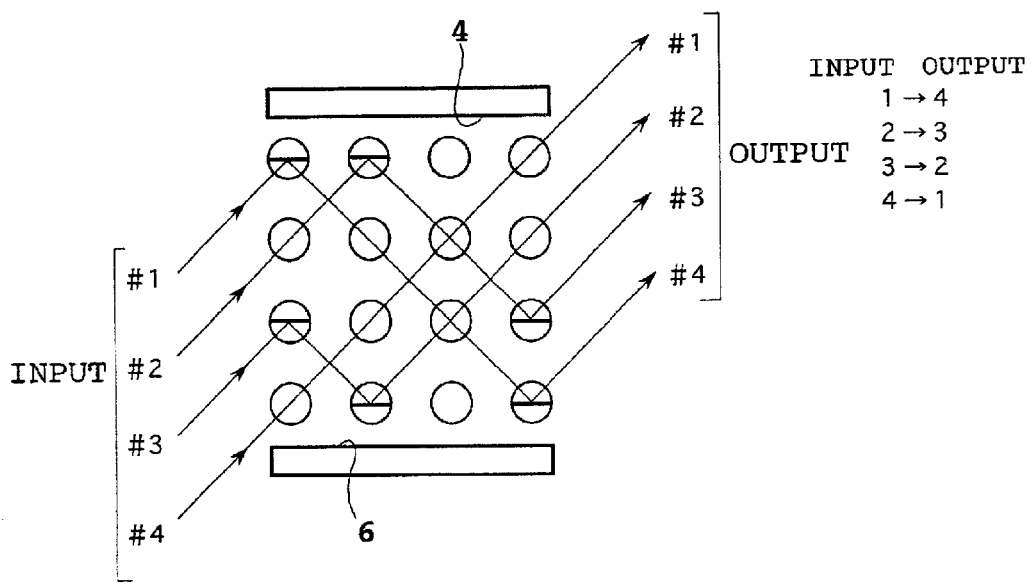

Referring to FIGS. 4A and 4B, there are shown examples of path setting in the optical switch shown in FIG. 3. FIG. 4A shows a case that the input channels #1 to #4 are connected to the output channels #1 to #4, respectively. In this case, the switch cells in the third row, the first column, in the third row, the second column, in the second row, the third column, and in the second row, the fourth column are in the second condition, and the other switch cells are in the first condition.

FIG. 4B shows a case that the input channels #1 to #4 are connected to the output channels #4 to #1, respectively. In this case, the switch cells in the first row, the first column, in the first row, the second column, in the third row, the first column, in the third row, the fourth column, in the fourth row, the second column, and in the fourth row, the fourth column are in the second condition, and the other switch cells are in the first condition. With the configuration of the optical switch as shown in FIG. 3, an arbitrary path can be established by the fixed mirrors 4 and 6 and the switch mirror 14 of each switch cell, thus allowing the provision of a nonblocking optical switch.

Figure 5:
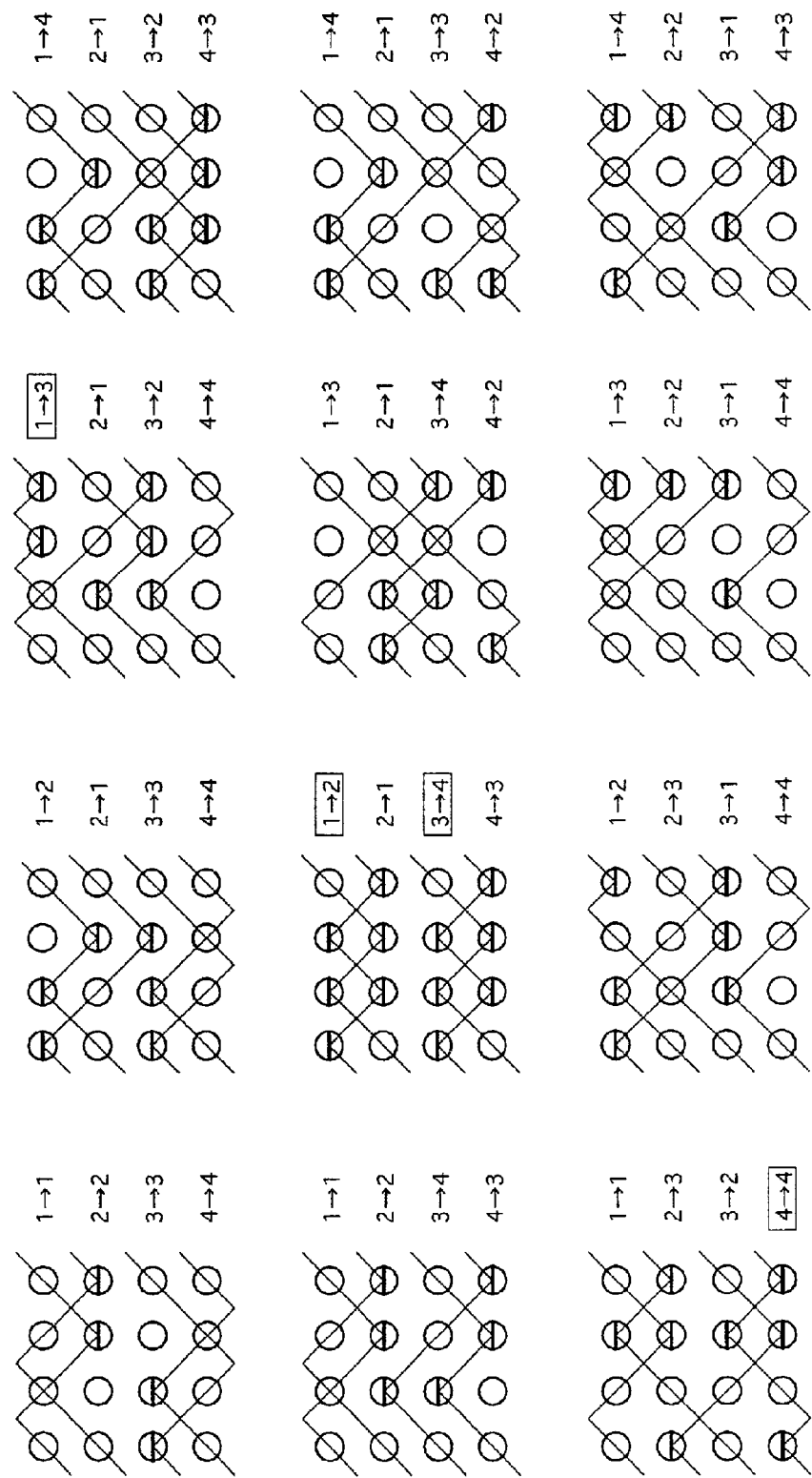
FIG. 5 is a schematic view showing a part of all examples of path setting in the optical switch shown in FIG. 3.
Figure 6:
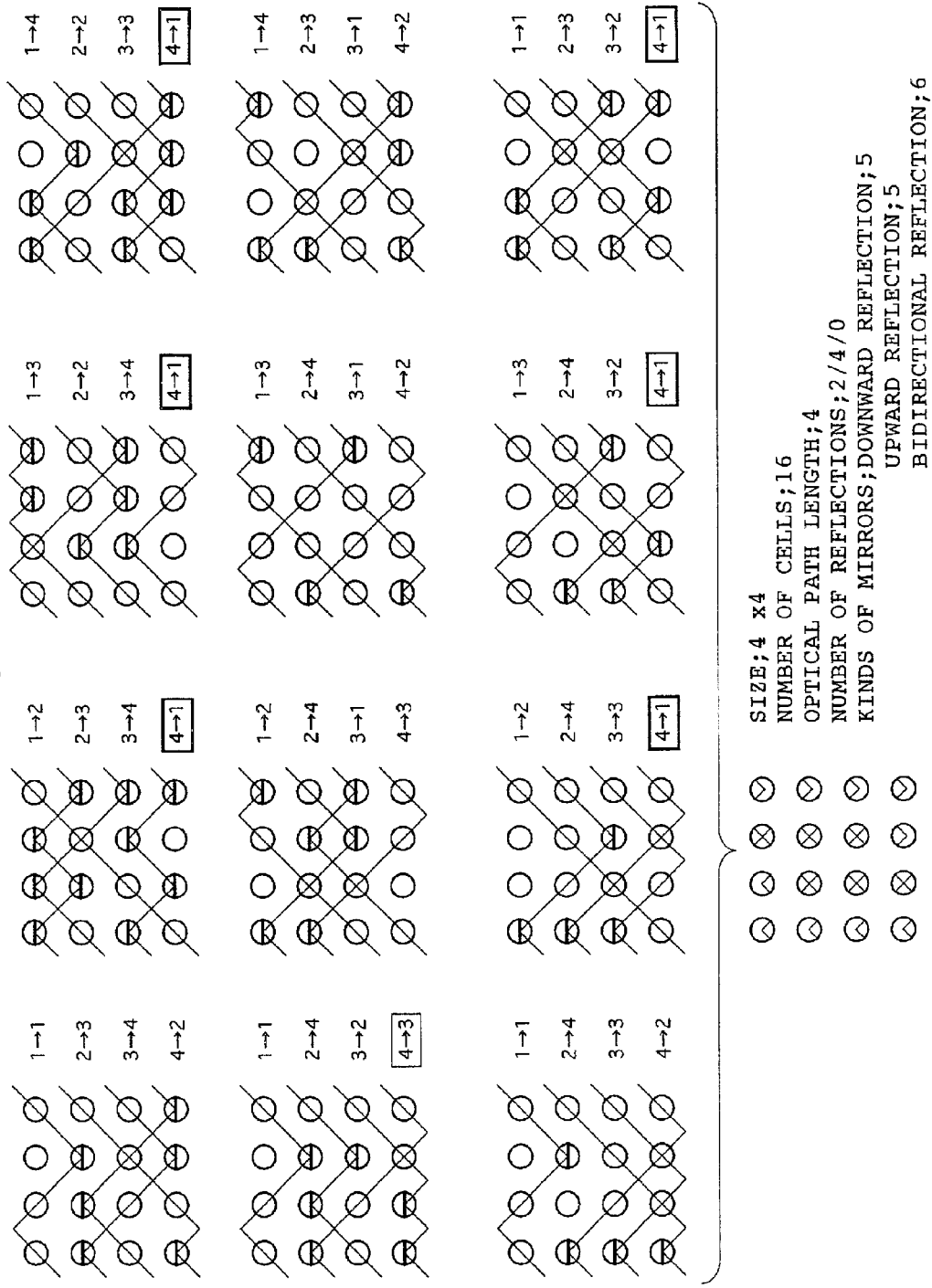
FIG. 6 is a schematic view showing the remaining part of all examples of path setting in the optical switch shown in FIG. 3.

FIGS. 5 and 6 show all examples of path setting in the optical switch shown in FIG. 3, and the manner of viewing the examples shown in FIGS. 5 and 6 is the same as that in FIGS. 4A and 4B.

The optical switch in this case has four inputs and four outputs. Accordingly, when the unit size defined as the distance between any nearest two switch cells is 1, the switch size is 4×4. Further, when the diagonal length of each switch cell is 1, the optical path length is 4 in all the examples. The number of reflections on the mirror surfaces is classified into three kinds, i.e., 2, 4, and 0. The optical switch has 16 switch cells classified into five switch cells having downward-only reflection mirrors (lower-sided reflection mirrors), five switch cells having upward-only reflection mirrors (upper-sided reflection mirrors), and six switch cells having bidirectional reflection mirrors (double-sided reflection mirrors).

Figures 7A, 7B:
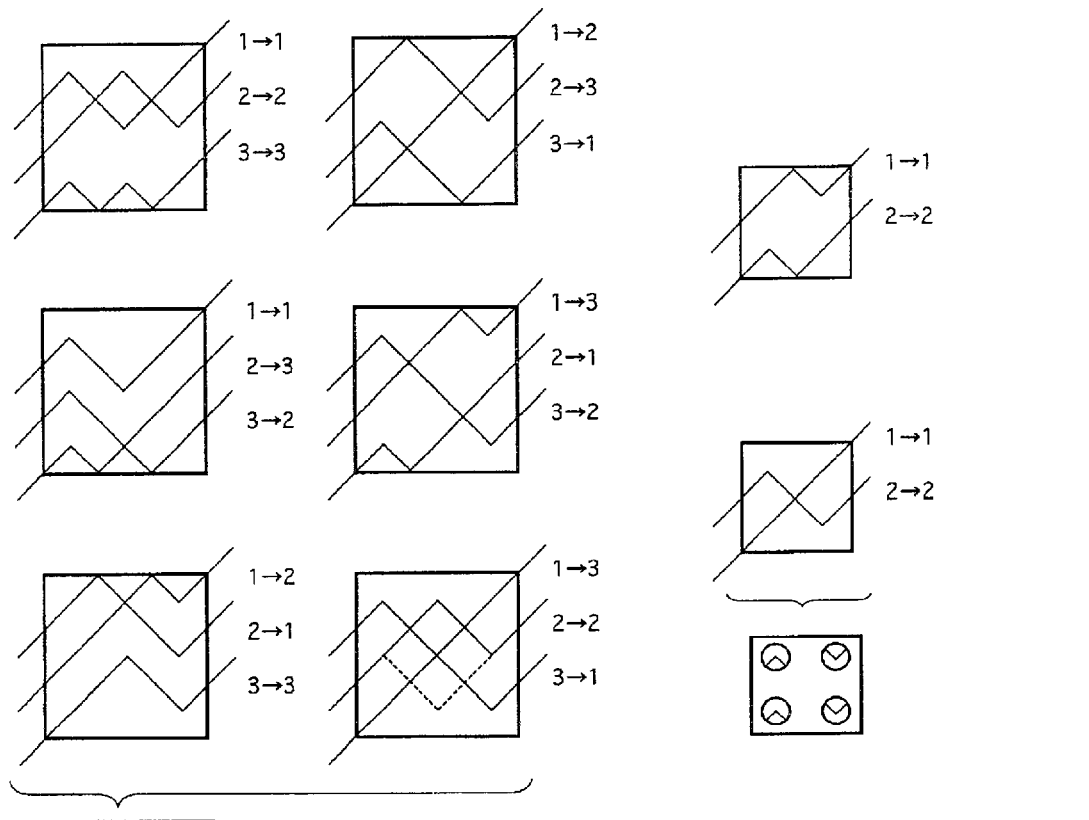
FIG. 7A is a schematic view showing all switching conditions in the case of a 3×3 optical switch.
FIG. 7B is a schematic view showing all switching conditions in the case of a 2×2 optical switch.

Referring to FIG. 7A, there are schematically shown all switching conditions in the case that the optical switch has three inputs and three outputs. The switch size is 3×3, and the optical path length is 3 when the diagonal length of each switch cell is 1. The number of reflections on the mirror surfaces is classified into three kinds, i.e., 2, 4, and 0. The optical switch in this case has nine switch cells classified into four switch cells having downward-only reflection mirrors, four switch cells having upward-only reflection mirrors, and one switch cell having a bidirectional reflection mirror.

Referring to FIG. 7B, there are schematically shown all switching conditions (two switching conditions) in the case that the optical switch has two inputs and two outputs. In this case, the switch size is 2×2, and the optical path length is 2 when the diagonal length of each switch cell is 1. The number of reflections on the mirror surfaces is classified into two kinds, i.e., 2 and 1. The optical switch in this case has four switch cells classified into two switch cells having downward-only reflection mirrors and two switch cells having upward-only reflection mirrors.

Figure 8:
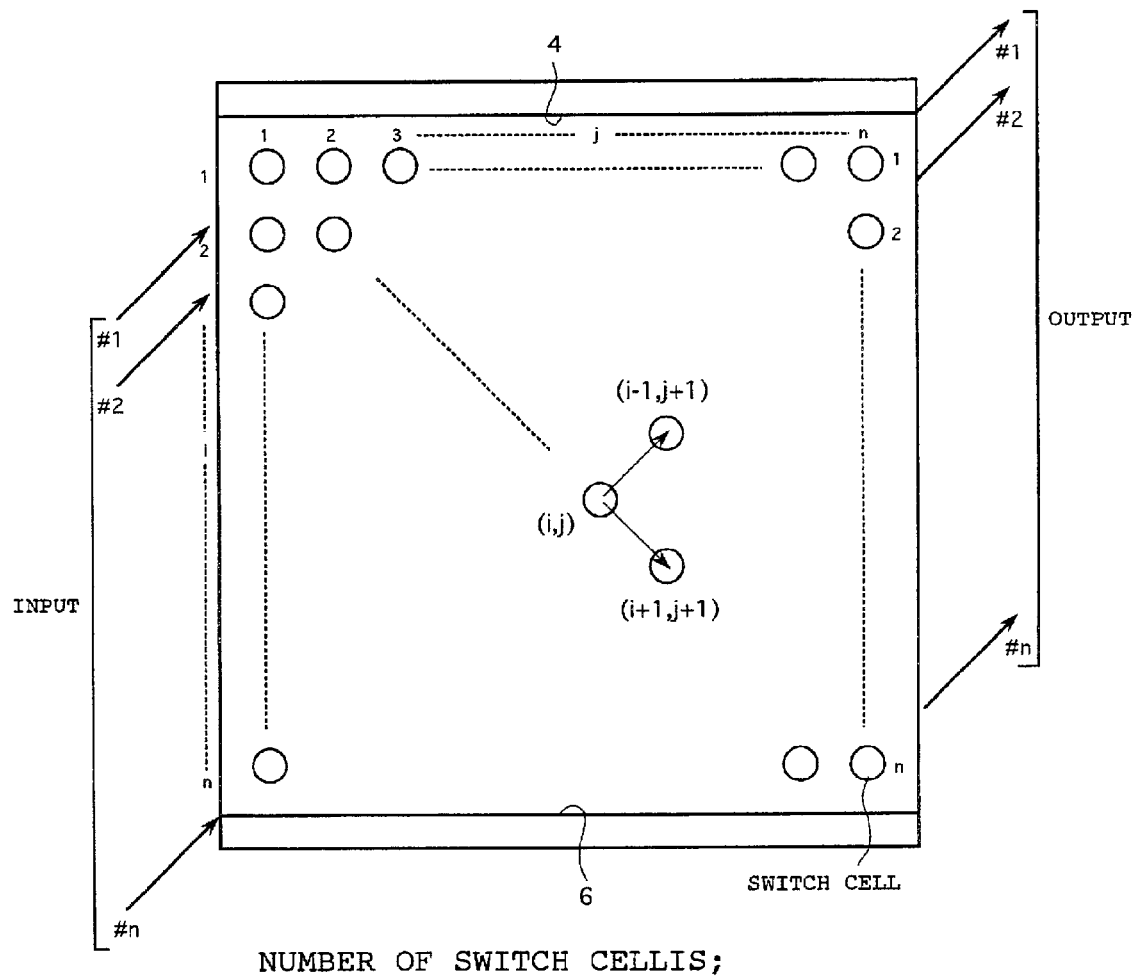
FIG. 8 is a schematic view for illustrating the arrangement of switch cells in the case of an n×n optical switch.

FIG. 8 is a schematic view for illustrating the arrangement of switch cells in the case that the optical switch has n inputs and n outputs (n is an integer greater than 2). The switch size is n×n, and the optical path length is n when the diagonal length of each switch cell is 1. The number of reflections on the mirror surfaces is classified into three kinds, i.e., 2, 4, and 0. The optical switch in this case has $n^2$ switch cells classified into (n+1) switch cells having downward-only reflection mirrors, (n+1) switch cells having upward-only reflection mirrors, and ($n^2-2n-2$) switch cells having bidirectional reflection mirrors.

The switch cell in the i-th row, the j-th column transmits incident light toward the switch cell in the (i+1)-th row, the (j+1)-th column in the first condition, or reflects incident light toward the switch cell in the (i−1)-th row, the (j+1)-th column in the second condition.

In the above preferred embodiment, the distance between any adjacent two switch cells arranged along each row is equal to the distance between any adjacent two switch cells arranged along each column, and the angle of incidence (the angle formed between the axis of an incident beam and each mirror surface) is 45°. However, the present invention is not limited to the configuration that the angle of incidence is 45°.

Figure 9:
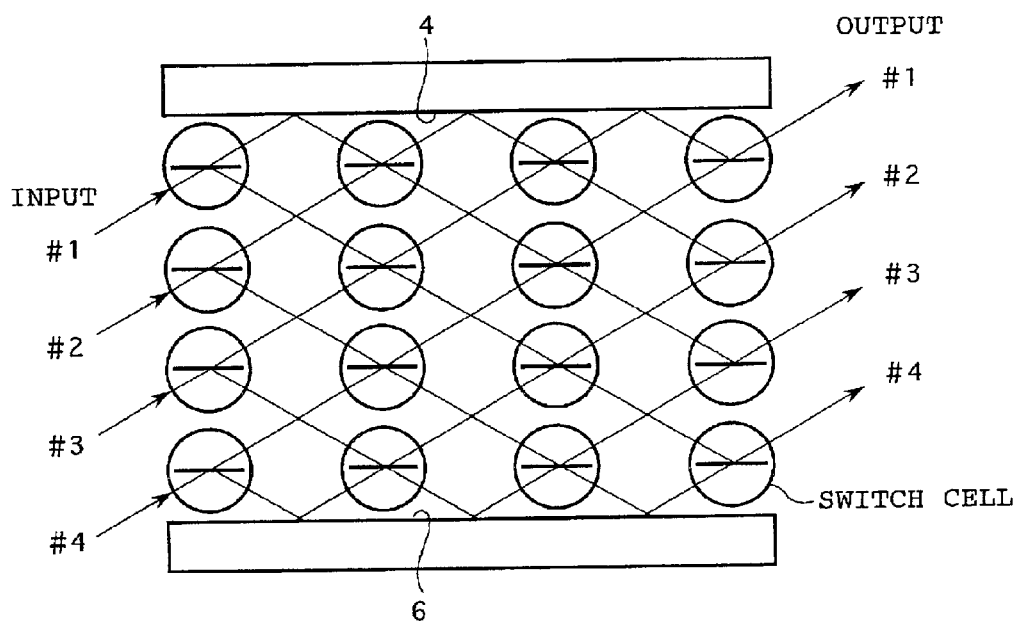
FIG. 9 is a schematic view showing a preferred embodiment in the case that the angle of incidence is 30°.

For example, the angle of incidence may be 30° as shown in FIG. 9. In this case, the distance between any adjacent two switch cells arranged along each row may be set twice the distance between any adjacent two switch cells arranged along each column.

Figure 10:
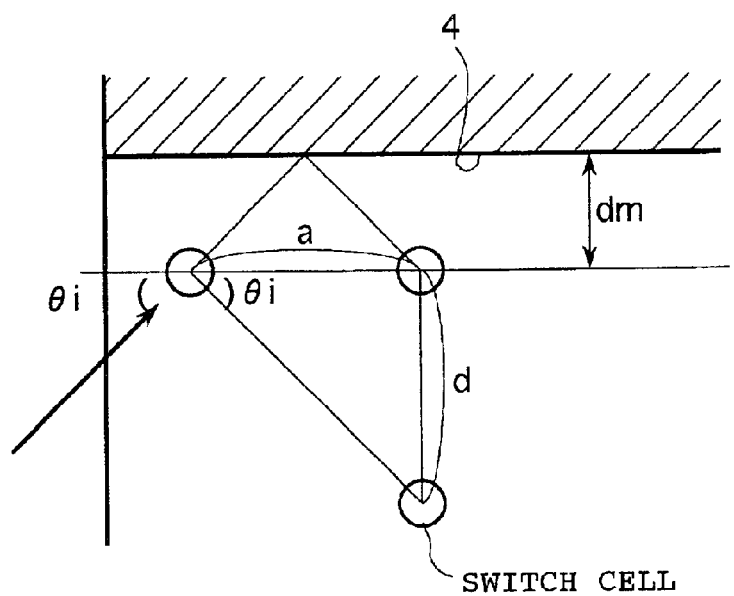
FIG. 10 is a schematic view showing a preferred embodiment in the case that the angle of incidence is θi.

Further, in the case that the angle of incidence is an arbitrary angle ($\theta i$) as shown in FIG. 10, the ratio of the distance between any adjacent two switch cells arranged along each row to the distance between any adjacent two switch cells arranged along each column may be set to 1: $\tan(\theta i)$.

Further, the distance $d_m$ between each switch cell in the first row and the mirror 4 is expressed as $d_m=(\frac{1}{2}) \times a \times \tan(\theta_i)$ where a is the distance between any adjacent two switch cells arranged along each row.

The optical switch according to the present invention has extensibility. For example, by using four substrates 2 each for the optical switch having four inputs and four outputs as shown in FIG. 3, an optical switch having eight inputs and eight outputs can be obtained.

Figure 11:
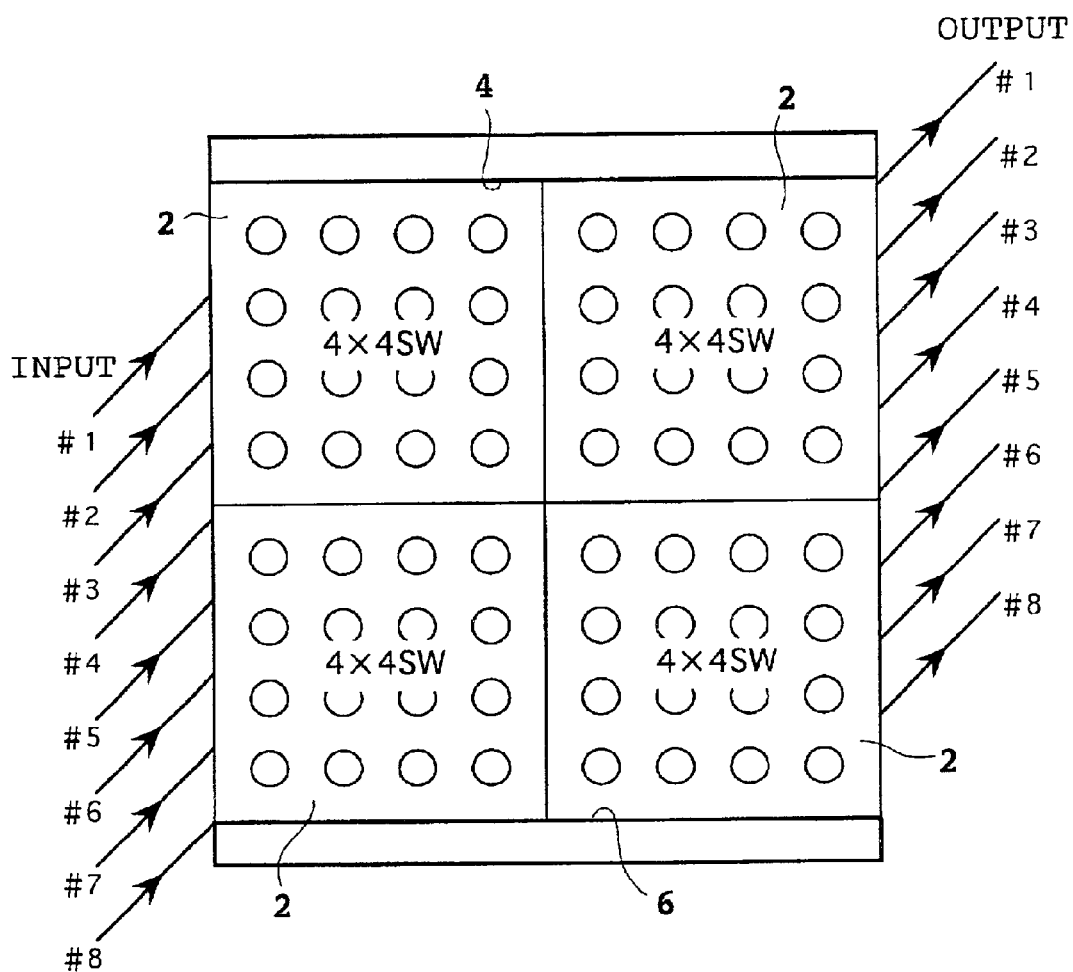
FIG. 11 is a schematic view for illustrating the extensibility of the preferred embodiment according to the present invention.

As shown in FIG. 11, such an 8×8 optical switch can be obtained by arranging four 4×4 substrates 2 so as to form a square substrate and interposing this square substrate between common mirrors 4 and 6.

While each switch cell is configured by using MEMS in the above preferred embodiment, a reflection type optical switch using a fluid may also be used. This reflection type optical switch is configured by enclosing a bubble-bearing liquid in a cavity formed in a solid having a certain refractive index and allowing the bubble to be moved by using a heater or the like. The refractive index of the liquid is set substantially equal to the refractive index of the solid. Accordingly, by setting an optical path extending through the cavity, the optical switch can switch between transmission and total reflection according to the presence or absence of the bubble.

Figure 12A:
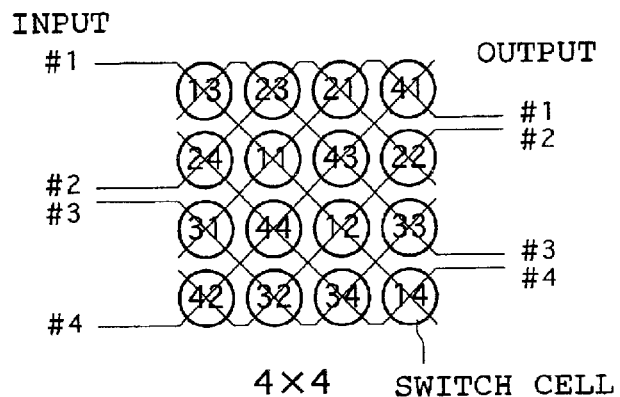
FIGS. 12A and 12B are schematic views showing a 4×4 optical switch and an 8×8 optical switch (path-independent type for each) each provided as an optical waveguide, respectively.
Figure 12B:
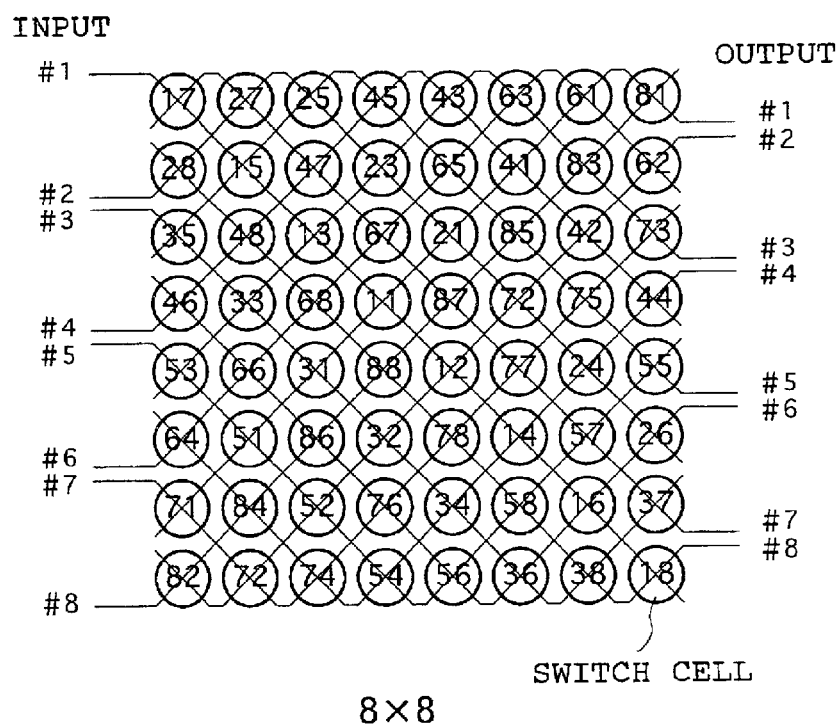

Referring to FIGS. 12A and 12B, there are shown a 4×4 optical switch and an 8×8 optical switch each provided as an optical waveguide, respectively. Each optical switch is of a path-independent type.

Each switch cell switches between a cross condition corresponding to the first condition and a bar condition corresponding to the second condition in the present invention. The numeral such as (13) or (23) shown in the circle representing each switch cell relates an input to an output. For example, the numeral (13) means a switch element for connecting an input channel #1 to an output channel #3. Further, each switch element maintains the cross condition in an electrically off condition, and changes to the bar condition when it is electrically turned on.

Figure 13A:
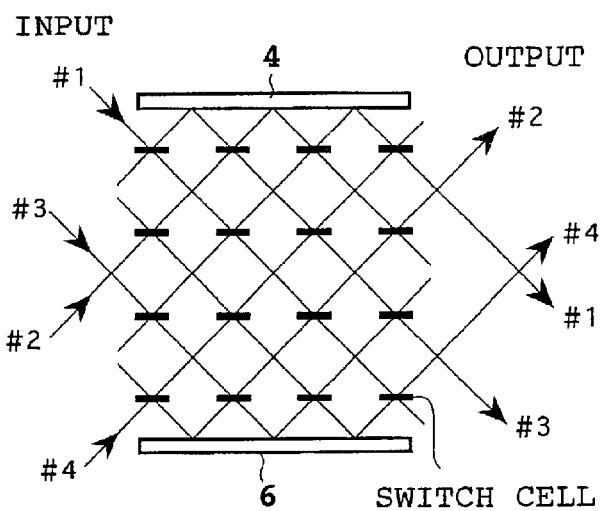
FIG. 13A is a schematic view showing an optical switch obtained by applying the logical configuration of the optical switch shown in FIG. 12B to the present invention.

FIG. 13A shows an optical switch obtained by applying the logical configuration of the optical switch shown in FIG. 12A to the present invention. More specifically, the odd-numbered channels and even-numbered channels of input optical paths cross each other, and the odd-numbered channels and even-numbered channels of output optical paths cross each other.

Figure 13B:
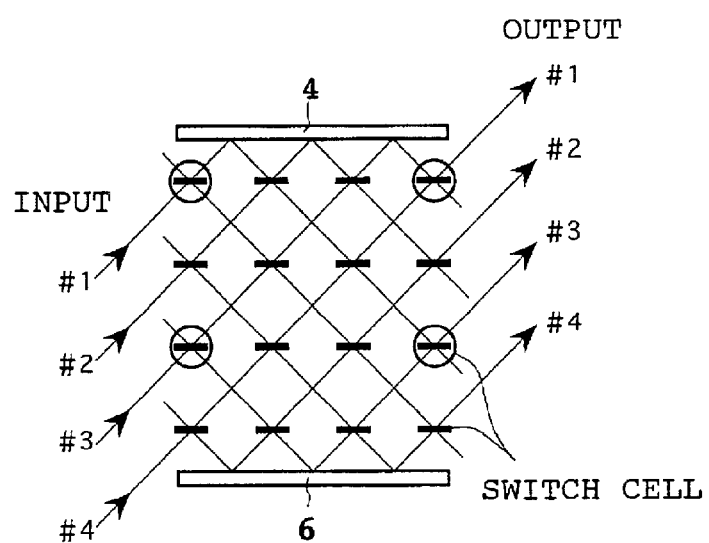
FIG. 13B is a schematic view showing a preferred embodiment for eliminating the problem in fabrication technique with the logical configuration shown in FIG. 13A being maintained.

In an optical waveguide of LN (LiNbO$_3$), for example, the presence of such crossings does not especially cause a problem in fabrication technique. However, in the case of providing the input optical paths and the output optical paths by using optical fiber arrays or the like, the crossing of the channels may be sometimes difficult in fabrication technique. FIG. 13B shows an optical switch which can eliminate the above problem in fabrication technique with the logical configuration shown in FIG. 13A being maintained.

As shown in FIG. 13B, the input optical paths are parallel to each other and the output optical paths are also parallel to each other. By inverting the logic in the input switch cells of the odd-numbered channels and the logic in the output switch cells of the odd-numbered channels or by inverting the logic in the input switch cells of the even-numbered channels and the logic in the output switch cells of the even-numbered channels, light is normally reflected by each switch cell, and in the case that each switch cell is made active to establish a path, light is not reflected by each switch cell.

In each of FIGS. 13A and 13B, the number of upward reflecting switch cells is 8 and the number of downward reflecting switch cells is 8. Further, the number of reflections on the mirror surfaces of the switch cells in FIG. 13A is classified into three kinds, i.e., 1, 2, and 3, and the number of reflections on the mirror surfaces of the switch cells in FIG. 13B is classified into three kinds, i.e., 0, 2, and 4.

In the configuration of FIG. 13A, each switch mirror is normally in the first condition, and in the case that each switch mirror is made active to establish a path, each switch mirror becomes the second condition. In the configuration of FIG. 13B, the switch cells enclosed by the circles are normally in the second condition, and become the first condition when establishing paths. The other switch cells are the same as those shown in FIG. 13A.

Figure 14A:
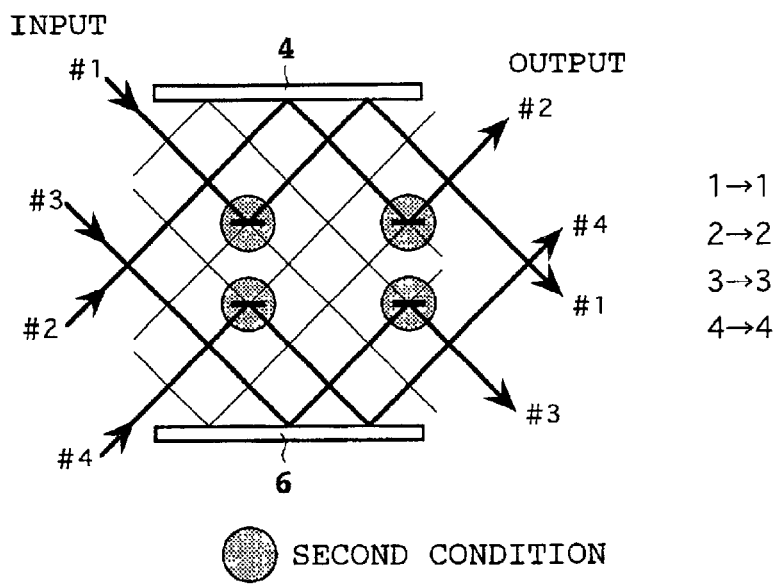
FIGS. 14A and 14B are schematic views showing examples of the operation of the optical switches shown in FIGS. 13A and 13B, respectively.
Figure 14B:
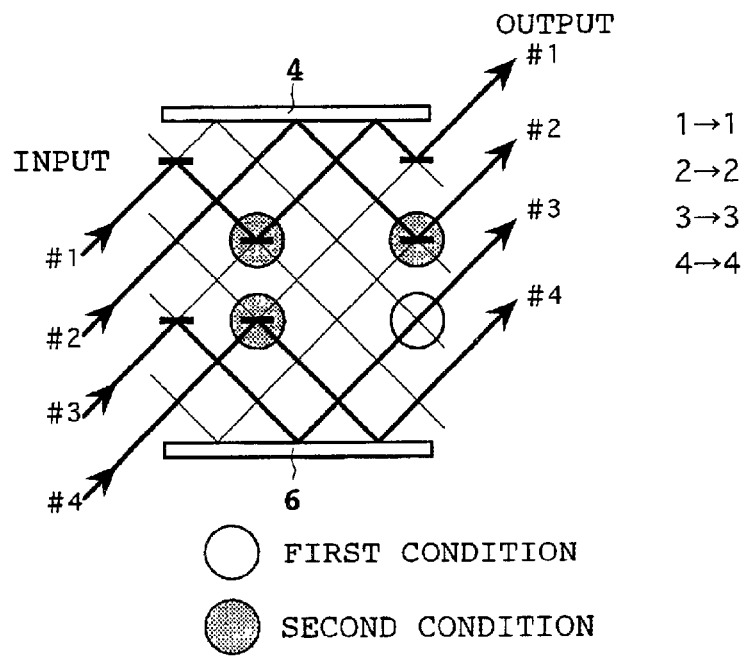
Figure 15:
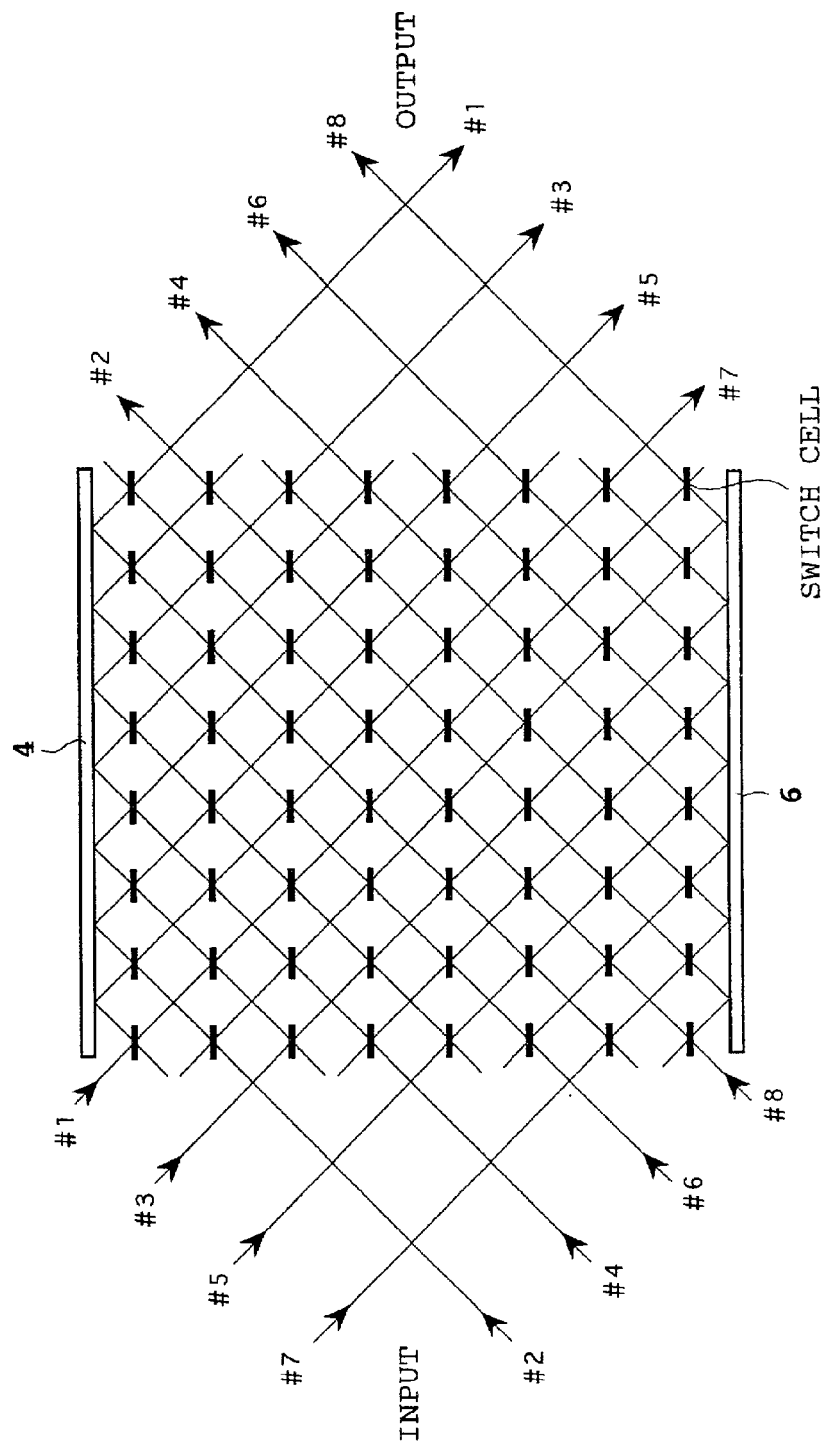
FIG. 15 is a schematic view showing an 8×8 optical switch having a configuration similar to that of the 4×4 optical switch shown in FIG. 13A.
Figure 16:
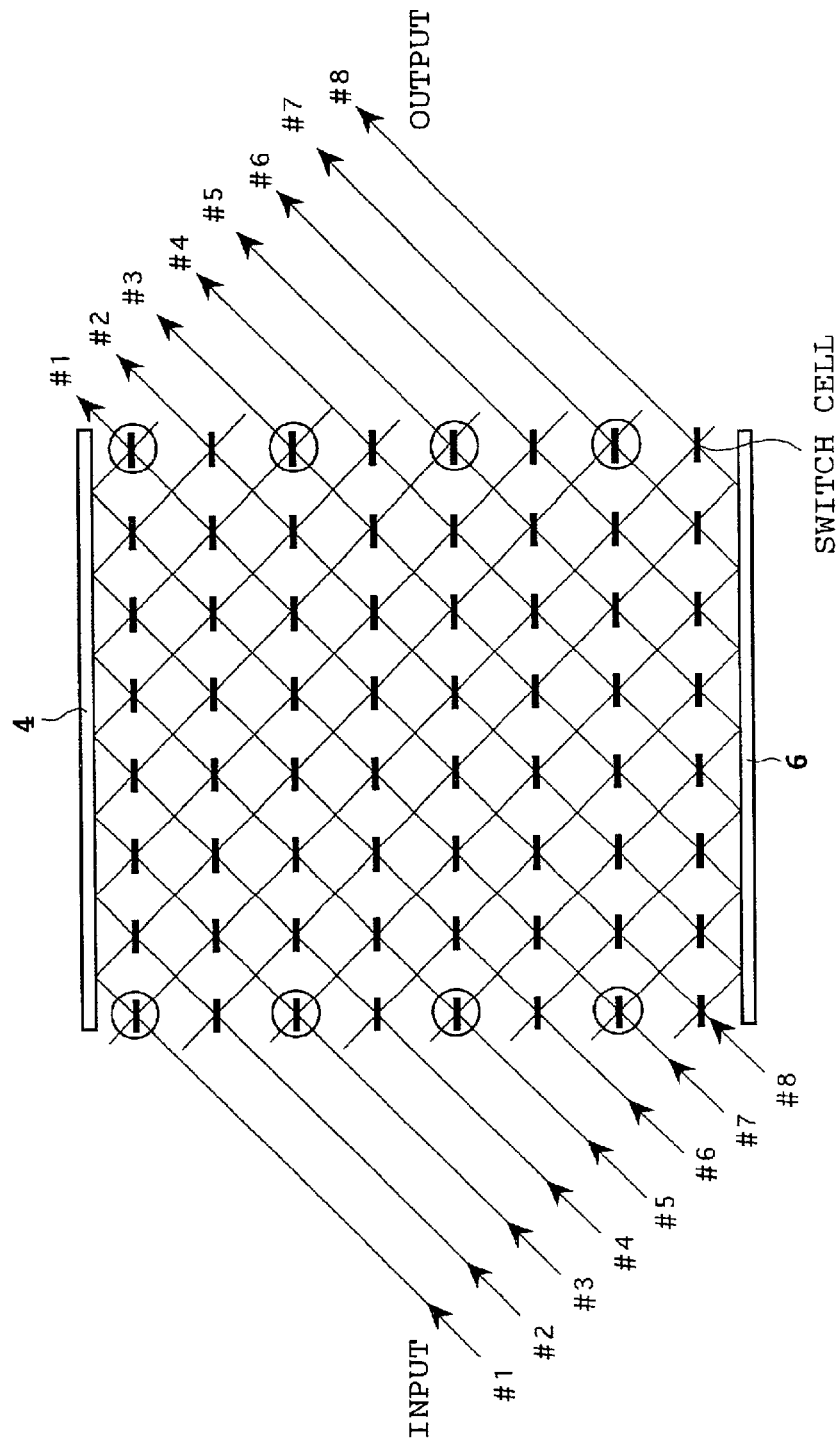
FIG. 16 is a schematic view showing an 8×8 optical switch having a configuration similar to that of the 4×4 optical switch shown in FIG. 13B.

FIGS. 14A and 14B show examples of the operation of the optical switches shown in FIGS. 13A and 13B, respectively, and FIGS. 15 and 16 show 8×8 optical switches having configurations similar to the configurations of the 4×4 optical switches shown in FIGS. 13A and 13B, respectively.

According to the present invention as described above, it is possible to provide a path-independent, nonblocking optical switch.

In an optical switch using optical MEMS, there is a possibility that an optical beam may spread to increase loss with an increase in optical path length because of spatial coupling between an input and an output. According to the present invention, the optical beam can be converged at an intermediate position on an optical path. This configuration will first be described in the case of a 4×4 optical switch with reference to FIGS. 17A and 17B.

Figure 17A:
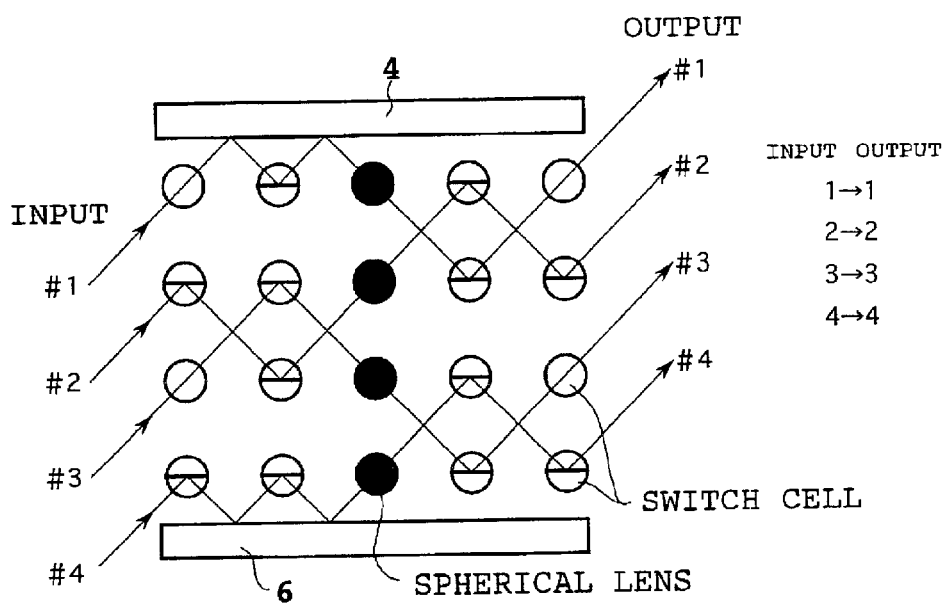
FIGS. 17A and 17B are schematic views for illustrating the operation of a 4×4 optical switch including spherical lenses according to the present invention.
Figure 17B:
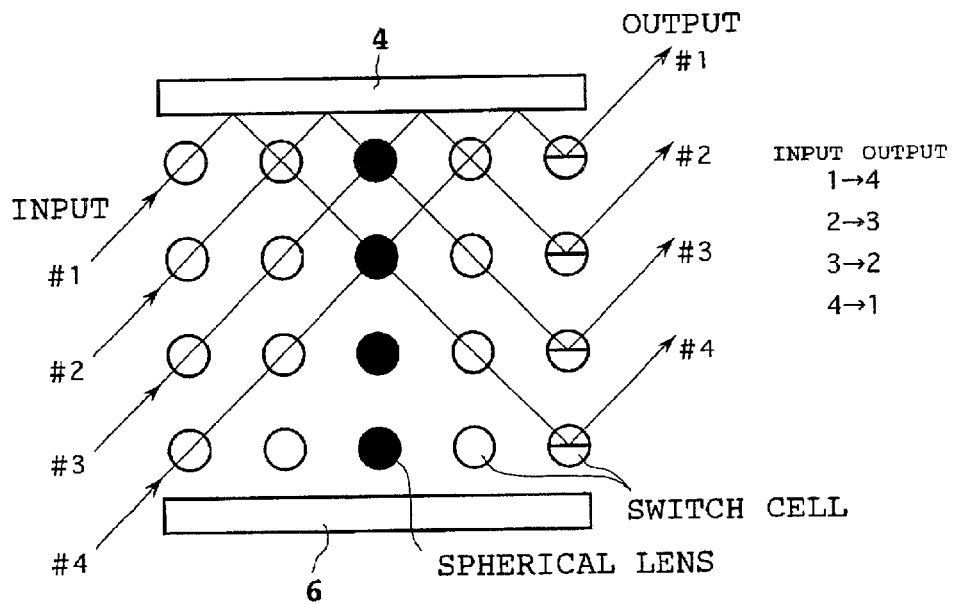

FIGS. 17A and 17B are schematic views for illustrating the operation of a 4×4 optical switch including spherical lenses according to the present invention. When the size of each switch cell 1, the switch size of this optical switch is 4×5, and when the diagonal length of each switch cell is 1, the optical path length in this optical switch is 5. In this example, four spherical lenses are provided in the third column.

In the condition shown in FIG. 17A, the input channels #1 to #4 are connected to the output channels #1 to #4, respectively. In the condition shown in FIG. 17B, the input channels #1 to #4 are connected to the output channels #4 to #1, respectively.

Figure 18:
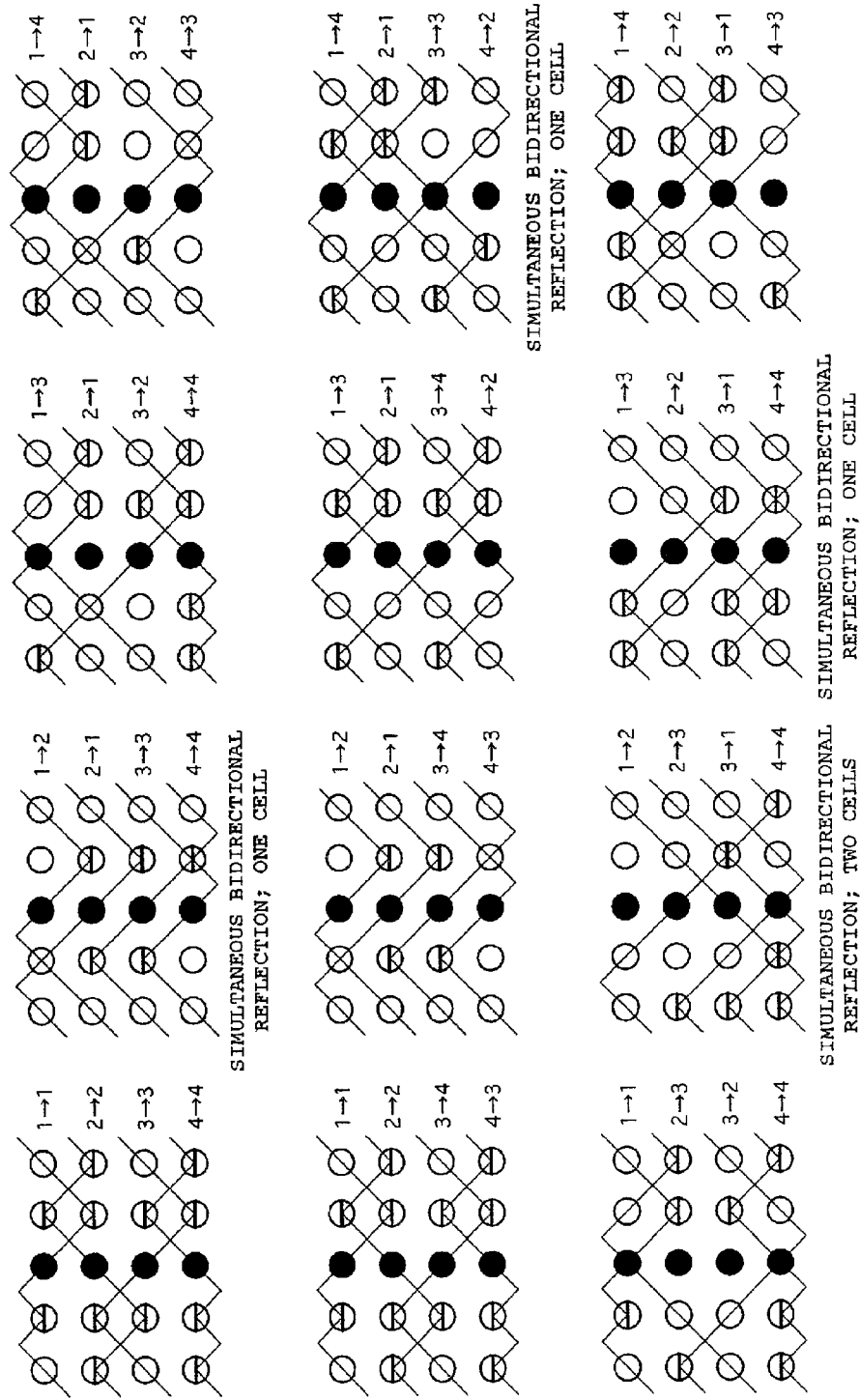
FIG. 18 is a schematic view showing a part of all, or 24 kinds of switching conditions of the optical switch shown in FIGS. 17A and 17B.
Figure 19:
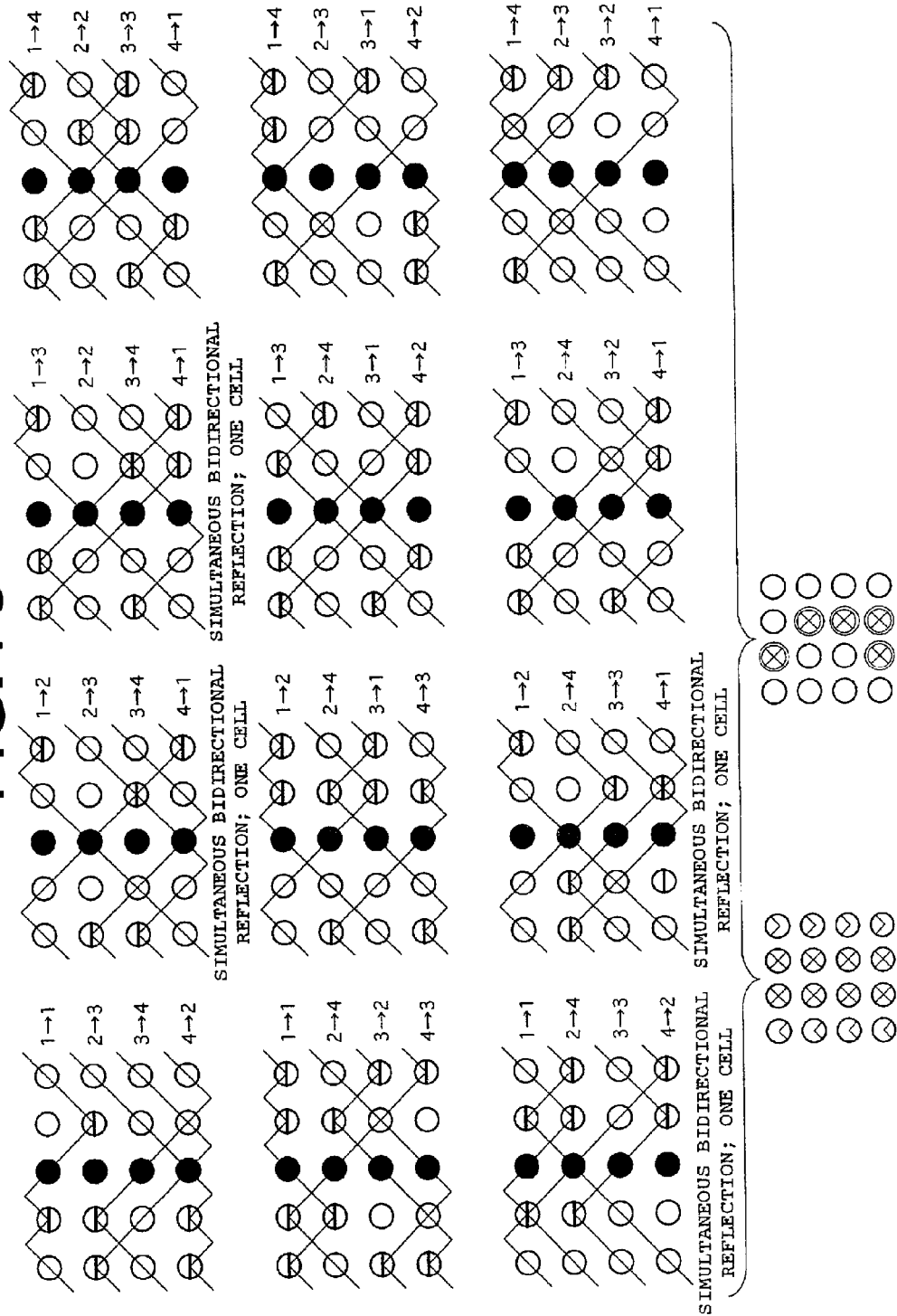
FIG. 19 is a schematic view showing the remaining part of all, or 24 kinds of switching conditions of the optical switch shown in FIGS. 17A and 17B.

FIGS. 18 and 19 are schematic views showing all switching conditions (24 kinds of switching conditions) of the optical switch shown in FIGS. 17A and 17B. The number of switch cells is 16, and these 16 switch cells are classified into four switch cells having downward-only reflection mirrors, four switch cells having upward-only reflection mirrors, and eight switch cells having bidirectional reflection mirrors. Five ones of the eight switch cells having bidirectional reflection mirrors perform simultaneous bidirectional reflection. If each bidirectional reflection mirror is thick in this case, it is difficult to simultaneously reflect two incident beams at a given reflection point. Accordingly, it is desirable to reduce the thickness of each reflection mirror according to the scale of the optical switch.

Figure 20:
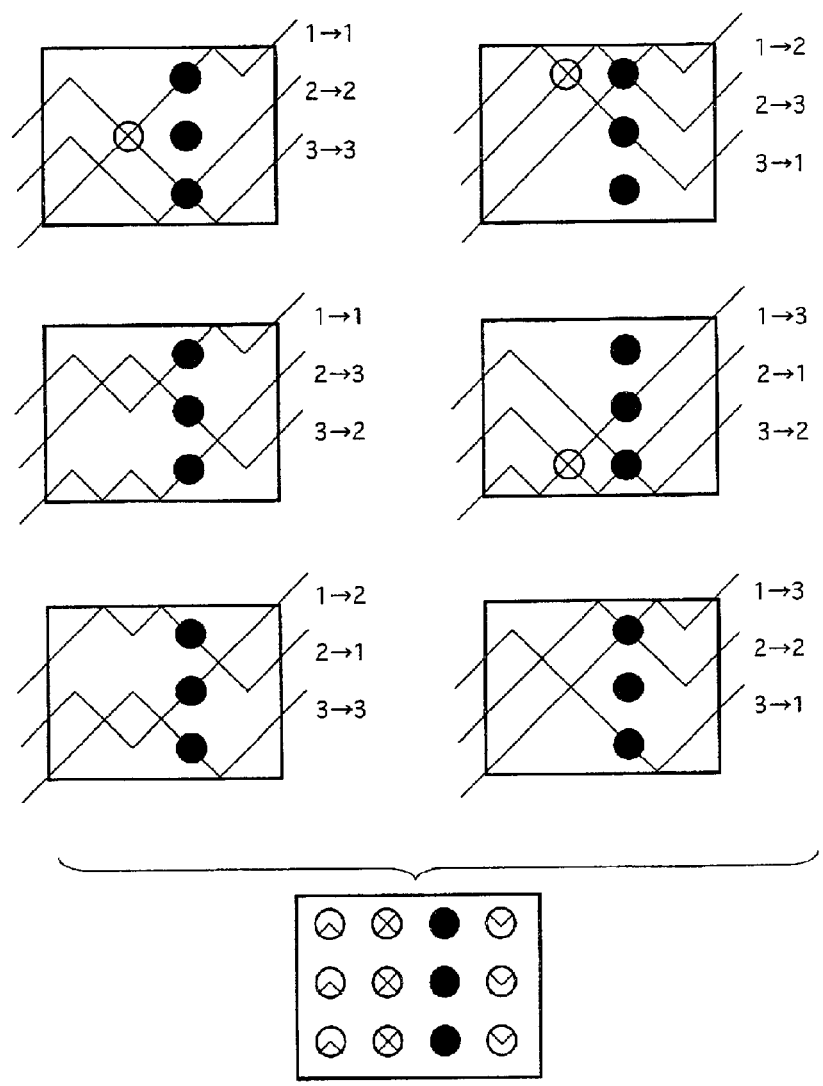
FIG. 20 is a schematic view showing all, or six kinds of switching conditions of a 3×3 optical switch according to the present invention as similar to the schematic views shown in FIGS. 18 and 19.

FIG. 20 is a schematic view showing all switching conditions (six kinds of switching conditions) of a 3×3 optical switch according to the present invention as similar to the schematic views shown in FIGS. 18 and 19. The switch size is 3×4 when the size of each switch cell is 1, and the optical path length is 4 when the diagonal length of each switch cell is 1. The number of reflections on the mirror surfaces is classified into two kinds, i.e., 2 and 4. The number of switch cells is 9, and these nine switch cells are classified into three switch cells having downward-only reflection mirrors, three switch cells having upward-only reflection mirrors, and three switch cells having bidirectional reflection mirrors.

Figure 21:
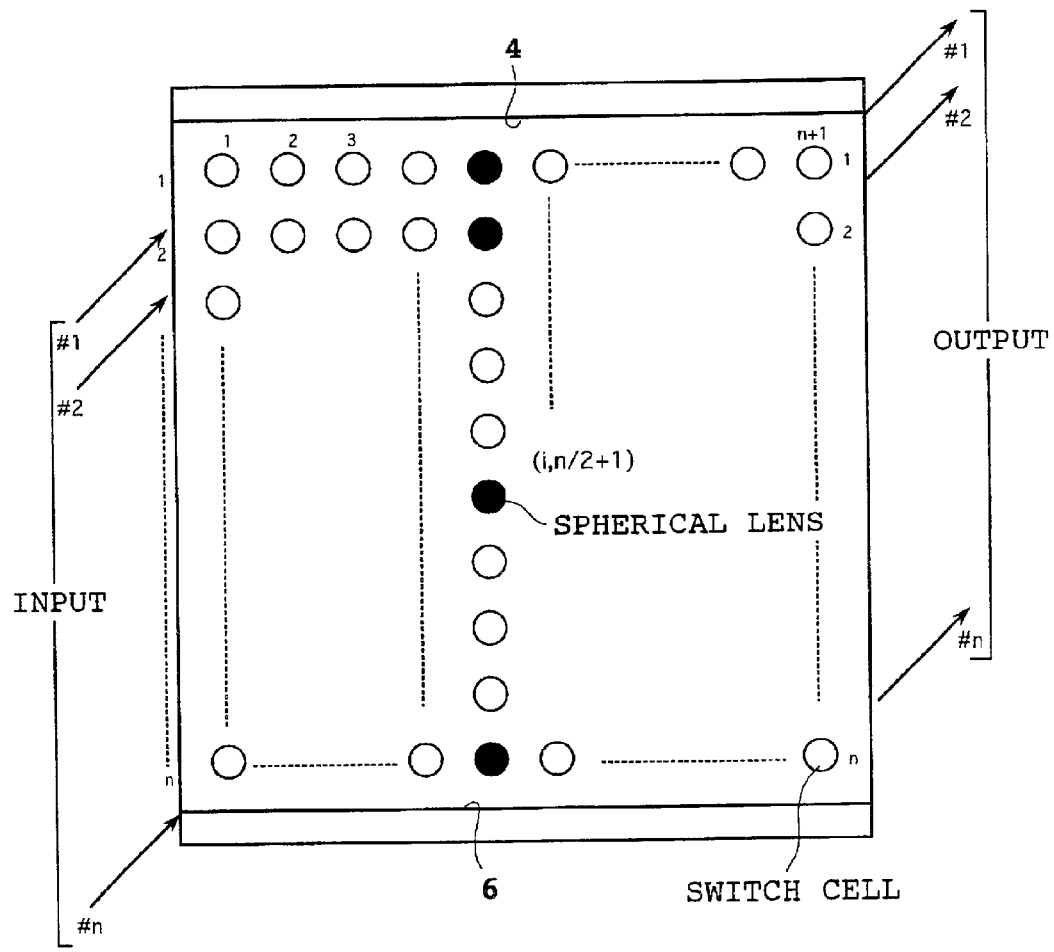
FIG. 21 is a schematic view for illustrating a general configuration of the optical switch according to the present invention including the configurations shown in FIGS. 17A, 17B, 18, 19, and 20.

FIG. 21 is a schematic view for illustrating a general configuration of the optical switch according to the present invention including the configurations shown in FIGS. 17A, 17B, 18, 19, and 20. That is, FIG. 21 shows the arrangement of switch cells and spherical lenses in an n×n optical switches (n is an integer greater than 2).

When n is an even number, the optical switch has n lenses arranged in the (n/2+1)-th column, whereas when n is an odd number, the optical switch has n lenses arranged in the [(n+1)/2+1]-th column. FIG. 21 shows the case where n is an even number.

The switch size is n×(n+1) when the size of each switch cell is 1, and the optical path length is (n+1) when the diagonal length of each switch cell is 1. The number of reflections on the mirror surfaces is classified into three kinds, i.e., 2, 4, and 6, or any two kinds selected from these three kinds. The number of switch cells is $n^2$, and these $n^2$ switch cells are classified into n switch cells having downward-only reflection mirrors (in the first column), n switch cells having upward-only reflection mirrors (in the n-th column), and ($n^2-2n$) switch cells having bidirectional reflection mirrors (in the other columns).

In the case that n is an even number, the optical path length on the input side of each spherical lens is equal to that on the output side of each spherical lens, so that a lens optical system can be easily designed.

There will now be described an optical switch according to the present invention to which rod lenses are applicable. In the preferred embodiment described with reference to FIGS. 17A, 17B, and 18 to 21, at most two optical paths having different directions pass through each lens. Therefore, it is necessary to use lenses having no anisotropy such as spherical lenses. To the contrary, the following preferred embodiment is configured so that at most one optical path passes through each lens, thereby facilitating lens mounting and optical axis alignment. In general, the tolerance of alignment of rod lenses is wider than that of spherical lenses.

Figure 22:
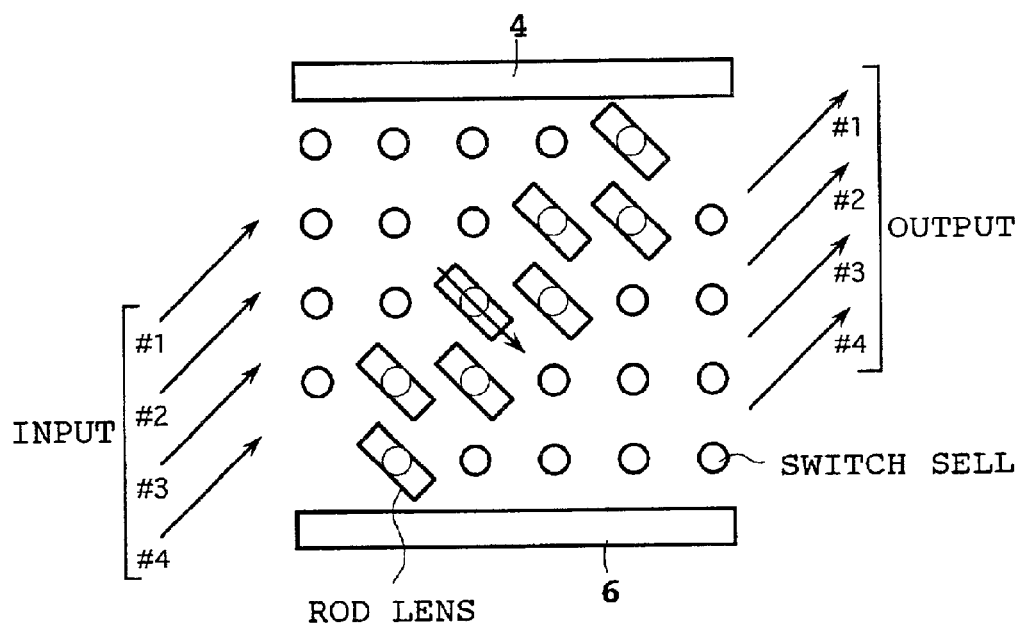
FIG. 22 is a schematic view showing a 4×4 optical switch including rod lenses according to the present invention.

FIG. 22 shows a 4×4 optical switch including rod lenses according to the present invention. The switch size is 5×6 when the size of each switch cell is 1, and the optical path length is 6 when the diagonal length of each switch cell is 1. Eight rod lenses are provided on the substrate 2 (not shown in FIG. 22, but see FIG. 3) formed with the switch cells. The rod lenses are zigzag arranged along a diagonal line of the substrate 2.

The number of switch cells is 20, and these 20 switch cells are classified into six switch cells having downward-only reflection mirrors, six switch cells having upward-only reflection mirrors, and eight switch cells having bidirectional reflection mirrors. In this preferred embodiment, it is not necessary to provide any simultaneous bidirectional reflection mirrors. The number of reflections on the mirror surfaces is classified into two kinds, i.e., 2 and 4. The eight rod lenses are arranged in the second to fifth columns so that every two rod lenses are arranged obliquely in parallel to each other in the same column. In the case that the input optical paths and the output optical paths are pointed upward to the right, each rod lens is pointed downward to the right.

Figure 23:
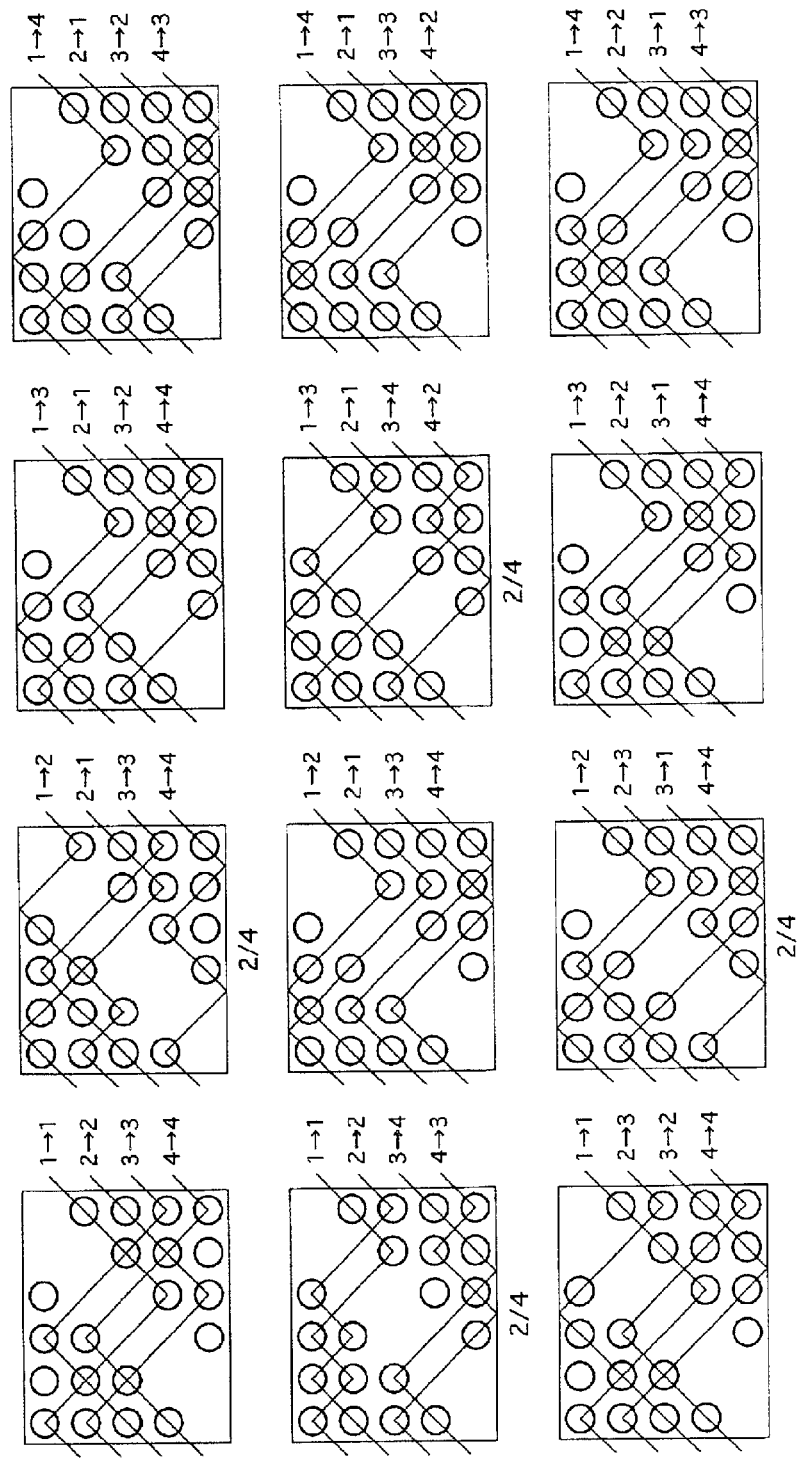
FIG. 23 is a schematic view showing a part of all, or 24 kinds of switching conditions of the optical switch shown in FIG. 22.
Figure 24:
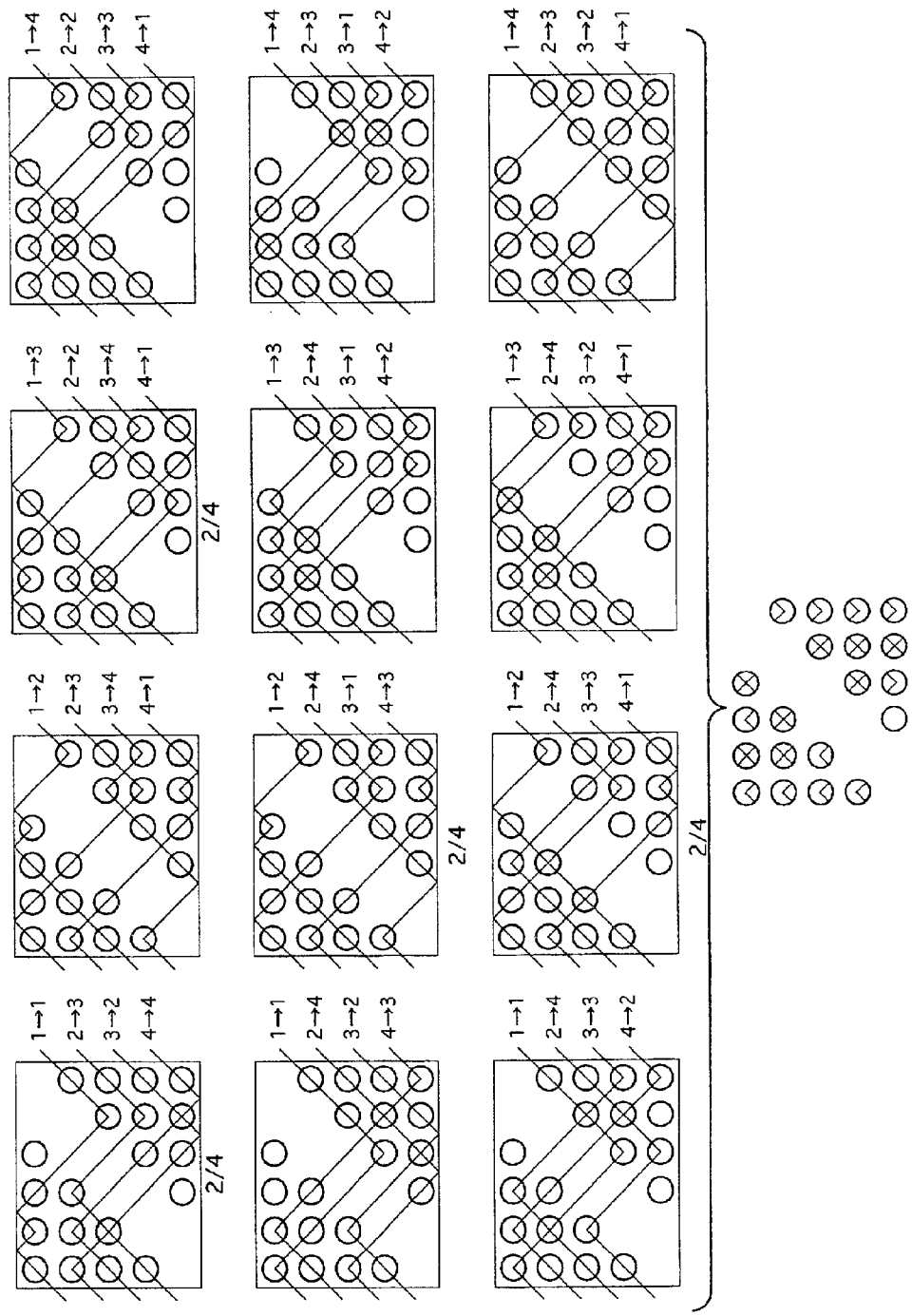
FIG. 24 is a schematic view showing the remaining part of all, or 24 kinds of switching conditions of the optical switch shown in FIG. 22.

FIGS. 23 and 24 are schematic views showing all switching conditions (24 kinds of switching conditions) of the optical switch shown in FIG. 22.

Figure 25:
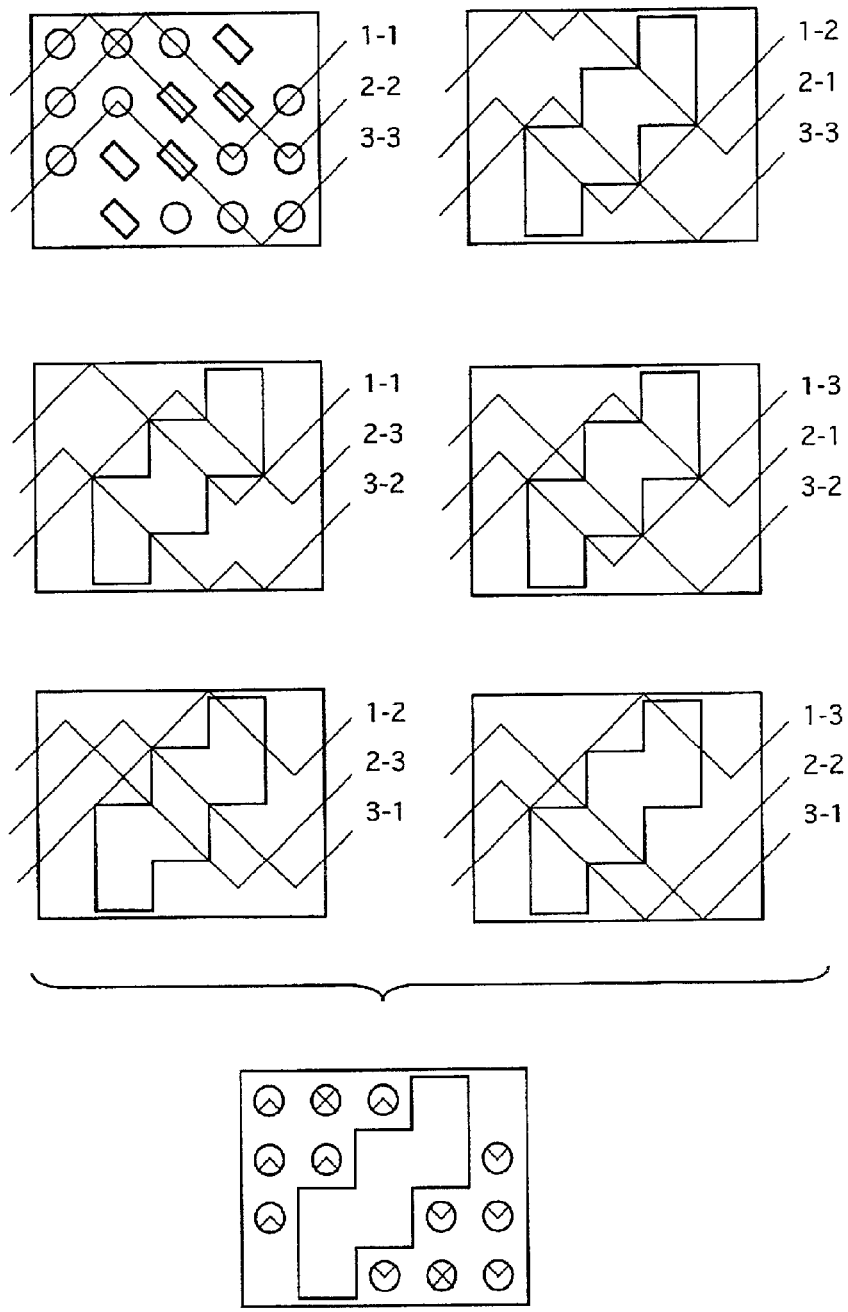
FIG. 25 is a schematic view showing all, or six kinds of switching conditions of a 3×3 optical switch configured similarly to the optical switch shown in FIG. 22.

FIG. 25 is a schematic view showing all switching conditions (six kinds of switching conditions) of a 3×3 optical switch configured similarly to the optical switch shown in FIG. 22. In the optical switch shown in FIG. 25, the switch size is 4×5 when the size of each switch cell is 1, and the optical path length is 5 when the diagonal length of each switch cell is 1. The number of reflections on the mirror surfaces is classified into two kinds, i.e., 2 and 4. The number of switch cells is 12, and these 12 switch cells are classified into five switch cells having downward-only reflection mirrors, five switch cells having upward-only reflection mirrors, and two switch cells having bidirectional reflection mirrors. In some switching conditions shown in FIG. 25, no rod lenses are shown, but a region where the rod lenses are present is shown.

FIG. 26 is a schematic view showing all switching conditions (two kinds of switching conditions) of a 2×2 optical switch configured similarly to the optical switch shown in FIG. 22. The switch size is 3×4 when the size of each switch cell is 1, and the optical path length is 4 when the diagonal length of each switch cell is 1. The number of reflections on the mirror surfaces is always 2. The number of switch cells is 6, and these six switch cells are classified into three switch cells having downward-only reflection mirrors and three switch cells having upward-only reflection mirrors.

Figure 27:
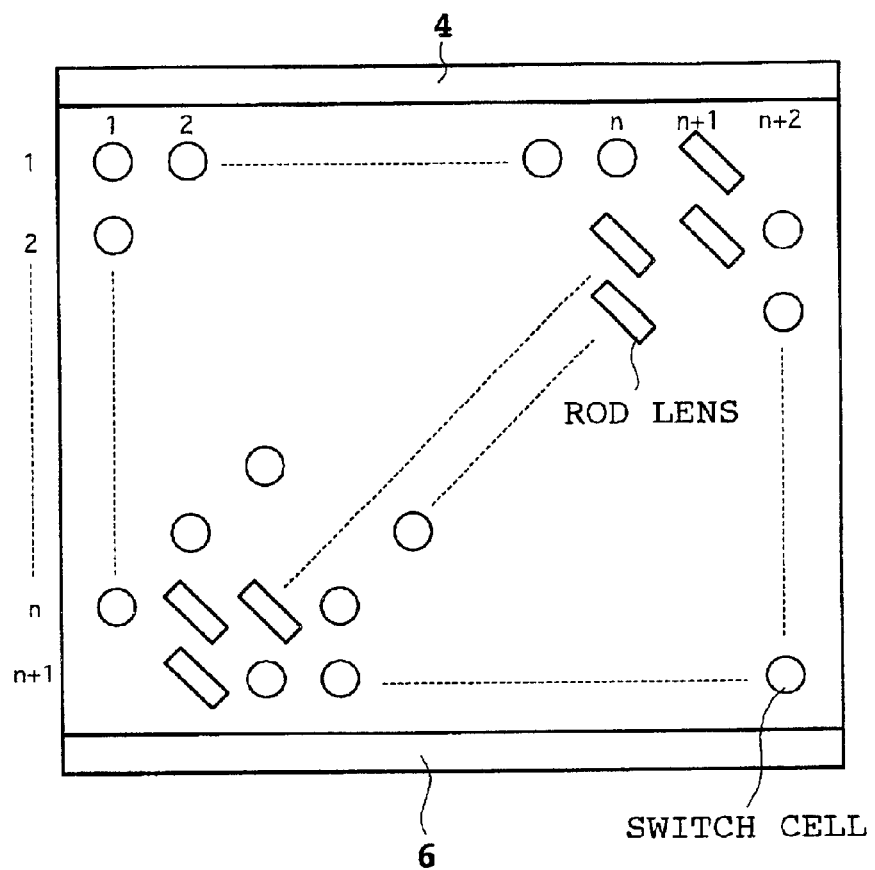
FIG. 27 is a schematic view showing the arrangement of switch cells and rod lenses in an n×n optical switch configured as similarly to the optical switch shown in FIG. 22.

FIG. 27 is a schematic view showing the arrangement of switch cells and rod lenses in an n×n optical switch configured similarly to the optical switch shown in FIG. 22. The switch size is (n+1)×(n+2) when the size of each switch cell is 1, and the optical path length is (n+2) when the size of each switch cell is 1. While the optical path length from an input to a rod lens and the optical path length from the rod lens to an output are different according to the column where the rod lens is positioned, the number of kinds of the rod lenses is about (n/2), which will be hereinafter discussed. The positions of the rod lenses are expressed in (row, column) as (1, n+1), (2, n), (2, n+1), . . . , (i, n−i+2), (i, n−i+3), . . . , (n, 2), (n, 3), and (n+1, 2).

The number of reflections on the mirror surfaces is classified into two kinds, i.e., 2 and 4.

The number of switch cells is n×(n+1). Of these n×(n+1) switch cells, the number of switch cells having downward-only reflection mirrors is 3 when n=2, 5 when n=3, or (2n−2) when n>3. The number of switch cells having upward-only reflection mirrors is the same as the number of switch cells having downward-only reflection mirrors. The number of switch cells having bidirectional reflection mirrors is 0 when n=2, 2 when n=3, or ($n^2-3n+4$) when n>3.

In the above preferred embodiments, the path depends on the number of mirror reflections inclusive of the reflection on the mirror 4 or 6. In the case that reflection loss is not negligible, the path dependence of loss is generated according to the number of reflections. In the following preferred embodiments, the number of reflections is fixed to 2 in order to eliminate the path dependence of loss.

Figure 28:
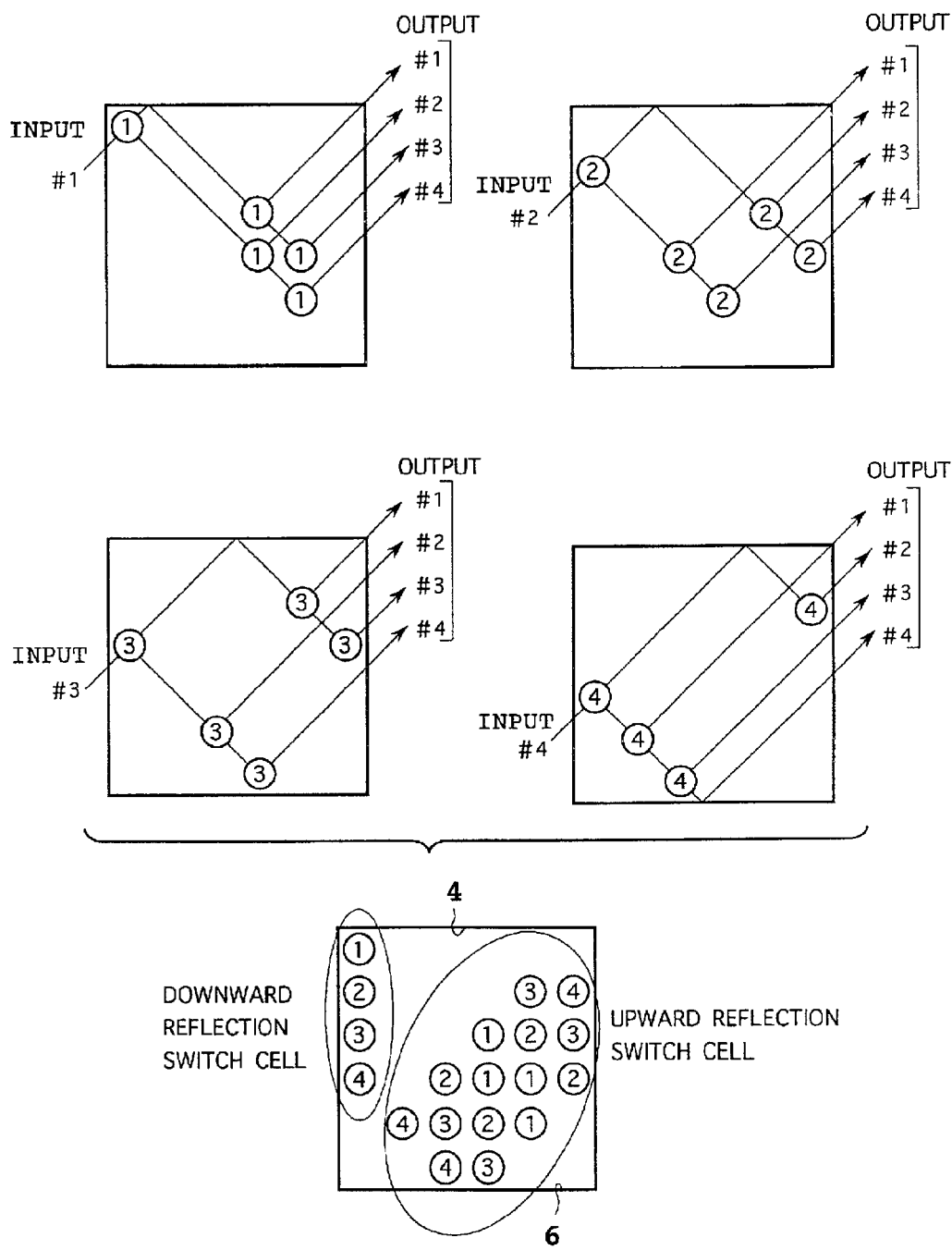
FIG. 28 is a schematic view for illustrating the configuration and operation of a 4×4 optical switch according to the present invention.

FIG. 28 is a schematic view for illustrating the configuration and operation of a 4×4 optical switch according to the present invention. Four switch cells are arranged in the first column on the input side, and an optical signal from each switch cell in the first column is switched by specific switch cells. The numerals shown in the circles representing all the switch cells mean input channel numbers. Five specific switch cells are allocated to each input channel, so that the optical signal is output after always two reflections without congestion.

The switch size is 6×6 when the size of each switch cell is 1, and the optical path length is 6 when the diagonal length of each switch cell is 1. This optical switch is characterized in that the number of reflections on the mirror surfaces is always 2. The number of switch cells is 19, and these 19 switch cells are classified into four switch cells having downward-only reflection mirrors and 15 switch cells having upward-only reflection mirrors.

Figure 29:
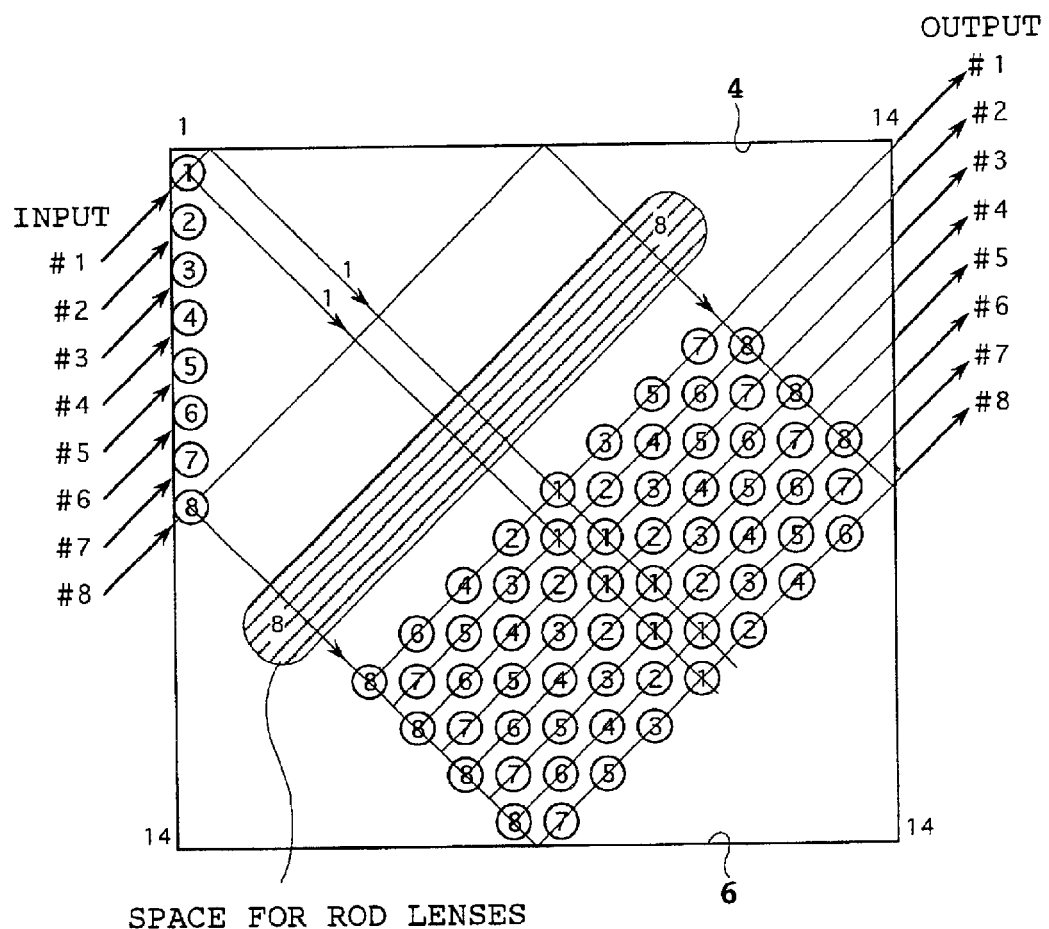
FIG. 29 is a schematic view showing an n×n optical switch according to the present invention.

FIG. 29 is a schematic view showing an n×n optical switch according to the present invention. In FIG. 29, an 8×8 optical switch as an example is shown. In the first column of the n×n optical switch, n switch cells for downward-only reflection are arranged. Each switch cell functions to divide an input channel into two optical paths. One of the two optical paths is provided by the first condition of each switch cell, and includes the reflection on the mirror 4. The other optical path is provided by the second condition of each switch cell, and does not include the reflection on the mirror 4. Further, $(n^2-1)$ switch cells for upward-only reflection are provided so that the optical paths from the n switch cells in the first column are coupled to the $(n^2-1)$ switch cells. Each switch cell for upward-only reflection is positioned so as to correspond to each signal optical path, and determines a final optical path reaching an output.

The switch size is $2(n-1)\times 2(n-1)$ when the size of each switch cell is 1, and the optical path length is $2(n-1)$ when the diagonal length of each switch cell is 1. The number of all switch cells is $(n^2+n-1)$. It is not necessary to provide any switch cells having bidirectional reflection mirrors.

While the number of reflections on the mirror surfaces is always 2, the optical path length is prone to increase. Accordingly, it is preferable to provide a rod lens along each optical path. As shown in FIG. 29, there is a space between the switch cells for downward-only reflection and the switch cells for upward-only reflection, and rod lenses may be provided in this space.

Figure 30:
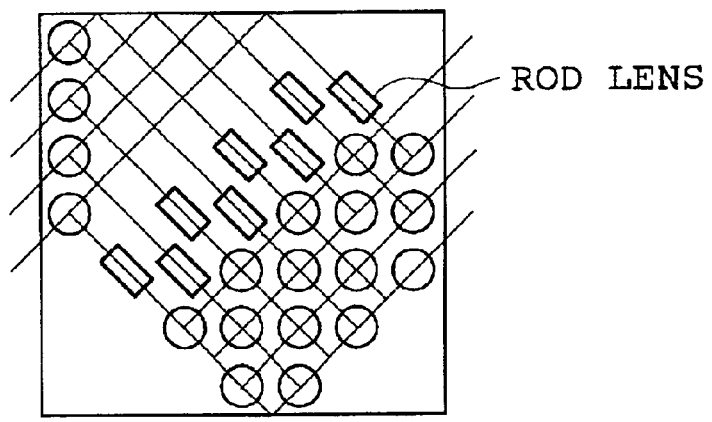
FIG. 30 is a schematic view for illustrating the formation of an excess space for rod lenses in the case that the number of channels is less than 6.

However, in the case that the number of channels is 5 or less, such a space for providing rod lenses is not present. Accordingly, it is preferable to define the rod lens space by adding one row and one column as shown in FIG. 30.

In the configuration of FIG. 29, the size of the rod lens space is $(n/2-2)$, and in the case that n is 6 or more, the size of the rod lens space becomes 1 or more.

The positions of the switch cells are expressed in (row, column) as follows:

For the switch cells having downward-only reflection mirrors:

$(i, 1); i=1$ to $n$

For the switch cells having upward-only reflection mirrors:

$(n/2+i, 2(n-1)-n/2+1-i); i=0$ to $(n-1)$ $(n/2+i, 2(n-1)-n/2+2-i); i=0$ to $(n-1)$ $(n/2+i+1, 2(n-1)-n/2+1-i); i=0$ to $(n-1)$ $(n-1+i, 2(n-1)-i); i=0$ to $(n-1)$ $(n+i, 2(n-1)-i); i=0$ to $(n-1)$

Figure 31:
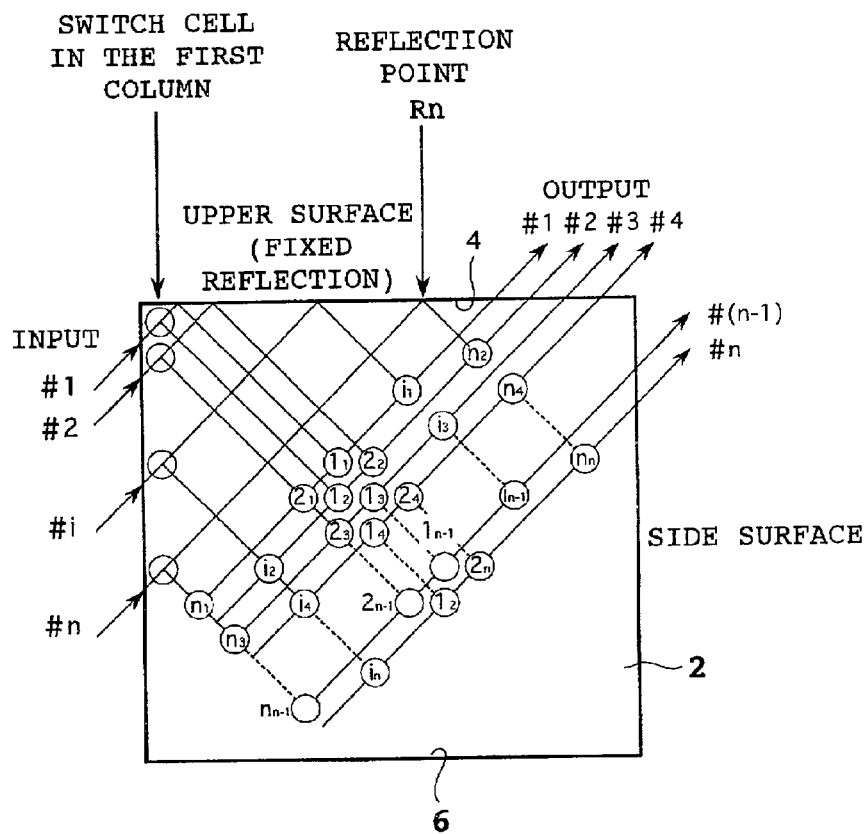
FIG. 31 is a schematic view for illustrating the operation of the n×n optical switch (see FIG. 29) according to the present invention.

The operation of the n×n optical switch (see FIG. 29) according to the present invention will now be described with reference to FIG. 31. First, the optical path from each switch cell in the first column is switched according to whether the output channel is an even-numbered channel or an odd-numbered channel. In the case that the output channel is an odd-numbered channel, the switch mirror of the switch cell in the first column corresponding to the input channel #2, for example, is raised (set to the second condition) to switch the input optical path to an optical path along a diagonal line extending from the left upper corner of the substrate 2 to the right lower corner thereof. In the case that the output channel is an even-numbered channel, the switch mirror of the switch cell is not raised (set to the first condition) to change the input optical path by the fixed mirror 4 provided on the upper side as viewed in FIG. 31.

Then, a final output channel is determined by a group of switch cells arranged along a diagonal line extending from the right upper corner of the substrate 2 to the left lower corner thereof. In FIG. 31, the switch cell shown by $(i_n)$ represents a switch cell whose switch mirror is raised when the input channel is #i and the output channel is #n.

The switch size of this optical switch will now be examined. Assuming that the input channel is #n and the output channel is an even-numbered channel, an optical signal from the switch cell corresponding to the input channel #n is reflected on the fixed mirror 4 at a reflection point Rn, and is next input into the switch cells shown by $n_2, n_4, \ldots, n_n$. When the group of switch cells for upward-only reflection is located not apart from the mirror 4 as shown, a part of the light beam is output from a position corresponding to the mirror 4 rather than from a side surface of the substrate 2, resulting in difficulty of handling. In FIG. 31, the output channels #1 to #4 are arranged at a position corresponding to the mirror 4.

Figure 32:
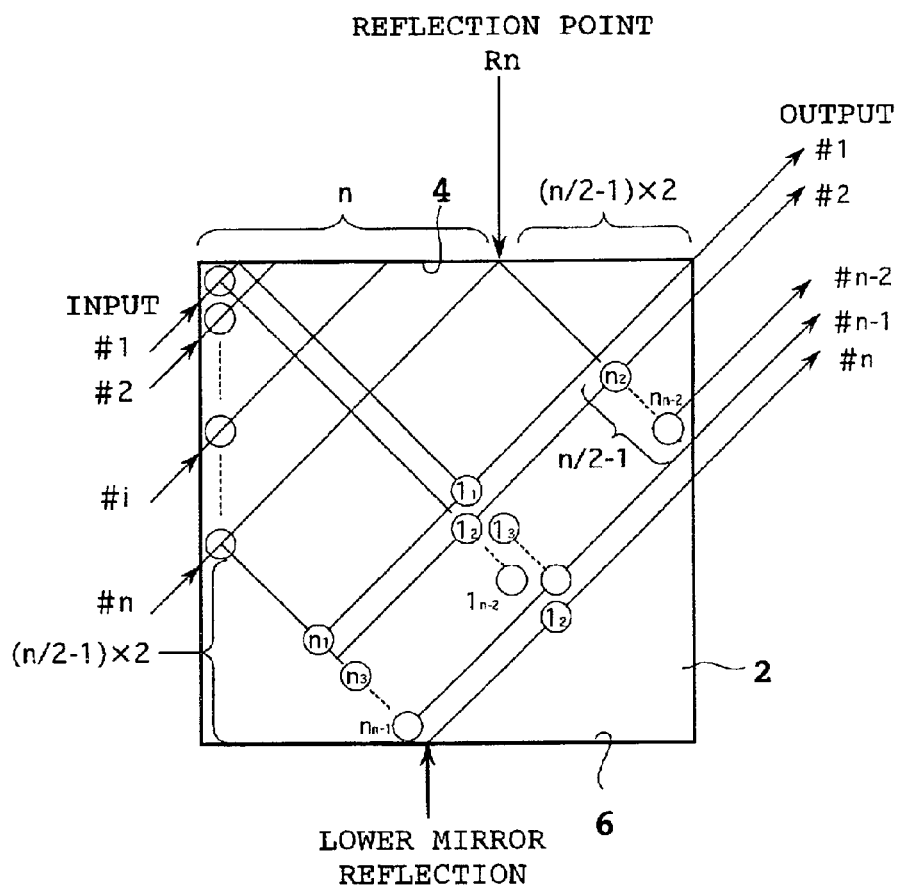
FIG. 32 is a schematic view for illustrating an improvement in the optical switch shown in FIG. 31.

FIG. 32 shows an improvement in the arrangement of the switch cells shown by $n_2, n_4, \ldots, n_n$ such that the output channel #1 is positioned at the right upper corner of the substrate 2. In this case, the size of each side of the substrate 2 is $n+2(n/2-1)=2n-2$, so that the switch size is $(2n-2)\times(2n-2)$. In this configuration, the output channel #n is provided by an optical path produced at a reflection point on the lower mirror 6 corresponding to the switch cell shown by $n_n-1$.

The number of all switch cells is $(n^2+n-1)$, in which the number of the downward reflection switch cells (the switch cells in the first column) is n and the number of the upward reflection switch cells (the group of switch cells arranged along the diagonal line extending from the right upper corner to the left lower corner of the substrate 2) is $(n^2-1)$. The number of reflections is always 2 regardless of the optical paths. The optical path length is $(2n-2)$ when the diagonal length of each switch cell is 1.

Figure 33:
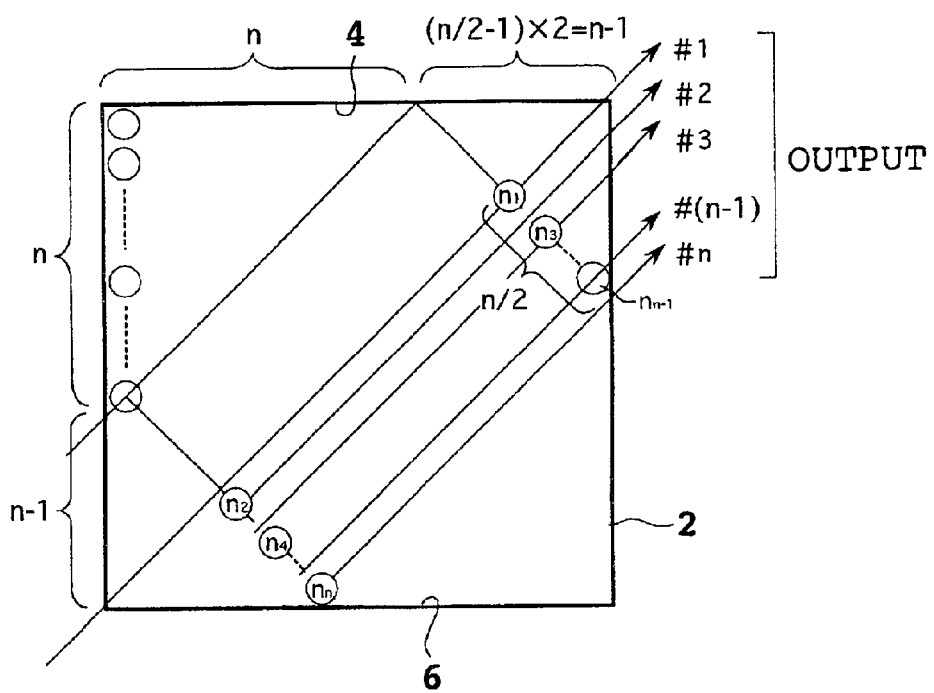
FIG. 33 is a schematic view for illustrating another improvement in the optical switch shown in FIG. 31.
Figure 34:
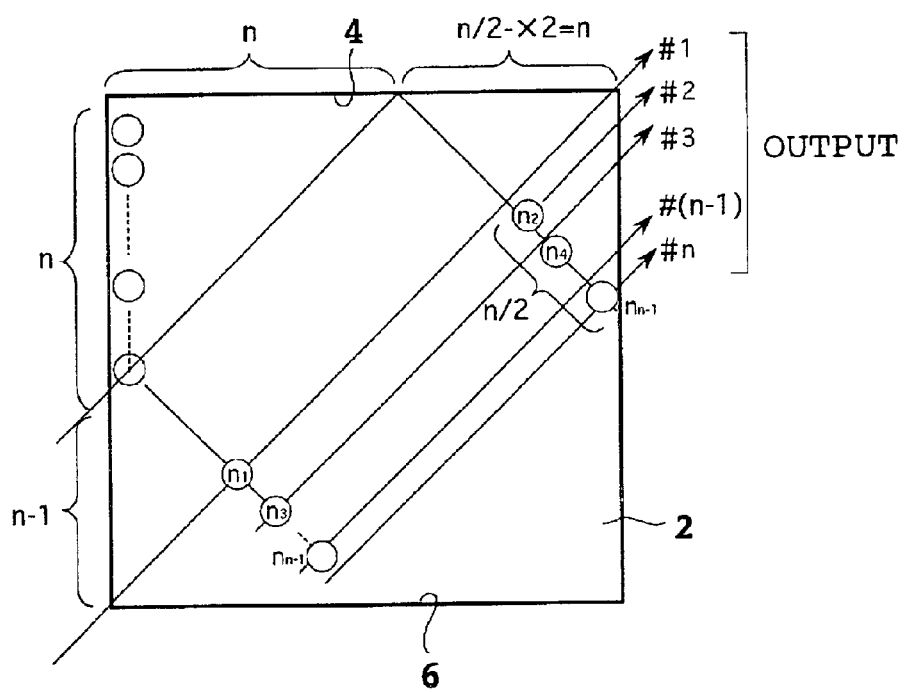
FIG. 34 is a schematic view for illustrating still another improvement in the optical switch shown in FIG. 31.

FIGS. 33 and 34 show modifications of the configuration shown in FIG. 32, in which the upward reflection switch cells corresponding to the output channels are changed in position. In the configuration of FIG. 33, the upward reflection switch cells corresponding to the odd-numbered output channels are arranged at right upper positions, and the upward reflection switch cells corresponding to the even-numbered output channels are arranged at left lower positions. On the other hand, in the configuration of FIG. 34, the upward reflection switch cells corresponding to the even-numbered output channels are arranged at right upper positions, and the upward reflection switch cells corresponding to the odd-numbered output channels are arranged at left lower positions.

In each case, the number of all switch cells is $(n^2+n)$, in which the number of the downward reflection switch cells (the switch cells in the first column) is n, and the number of the upward reflection switch cells (the group of switch cells arranged along the diagonal line extending from the right upper corner to the left lower corner of the substrate 2) is $n^2$.

The switch size of the optical switch shown in FIG. 33 is $(2n-1)\times(2n-1)$, and the optical path length is $(2n-1)$ when the diagonal length of each switch cell is 1. The switch size of the optical switch shown in FIG. 34 is $2n\times 2n$, and the optical path length is $2n$.

In each case, the number of reflections is 2, and the path dependence of loss according to the number of reflections can be eliminated. As a result, it is possible to use mirrors whose reflection loss is not low.

Further, in each of the preferred embodiments shown in FIGS. 33 and 34, it is not necessary to provide a lower mirror (the mirror 6 in the previous preferred embodiments), thereby facilitating the manufacture of the optical switch.

There will now be described another preferred embodiment eliminating the path dependence of loss according to the number of mirror reflections like the above preferred embodiments shown in FIGS. 28 to 34.

Figure 35:
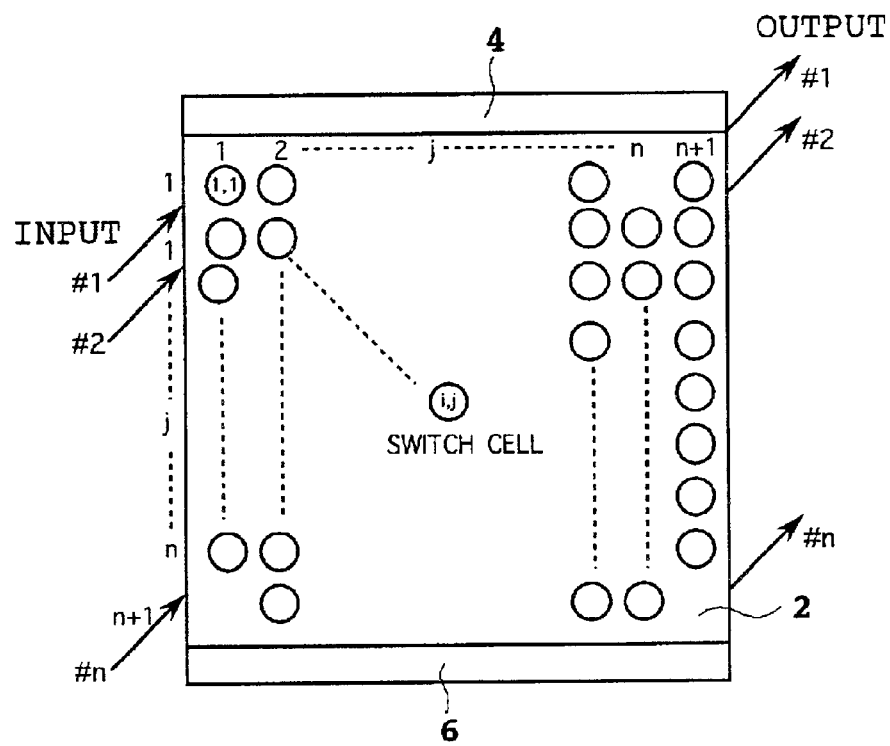
FIG. 35 is a schematic view showing an n×n optical switch according to the pre sent invention.

FIG. 35 shows an n×n optical switch according to the present invention. A plurality of switch cells are arranged in the form of an (n+1)×(n+1) lattice. It is not necessary to provide switch cells at the positions of ((n+1), 1), ((n+1), (n+1)), and (1, n) expressed in (row, column), so that the number of all switch cells is ($n^2+2n-2$).

The switch size is (n+1)×(n+1), and the optical path length is (n+1) when the diagonal length of each switch cell is 1. The number of mirror reflections is always 2 regardless of the optical paths.

The number of switch cells having downward-only reflection mirrors is n(n+1)/2−1, and the number of switch cells having upward-only reflection mirrors is n(n+1)/2−1+n. In this preferred embodiment, it is not necessary to provide switch cells having bidirectional reflection mirrors.

Figure 36:
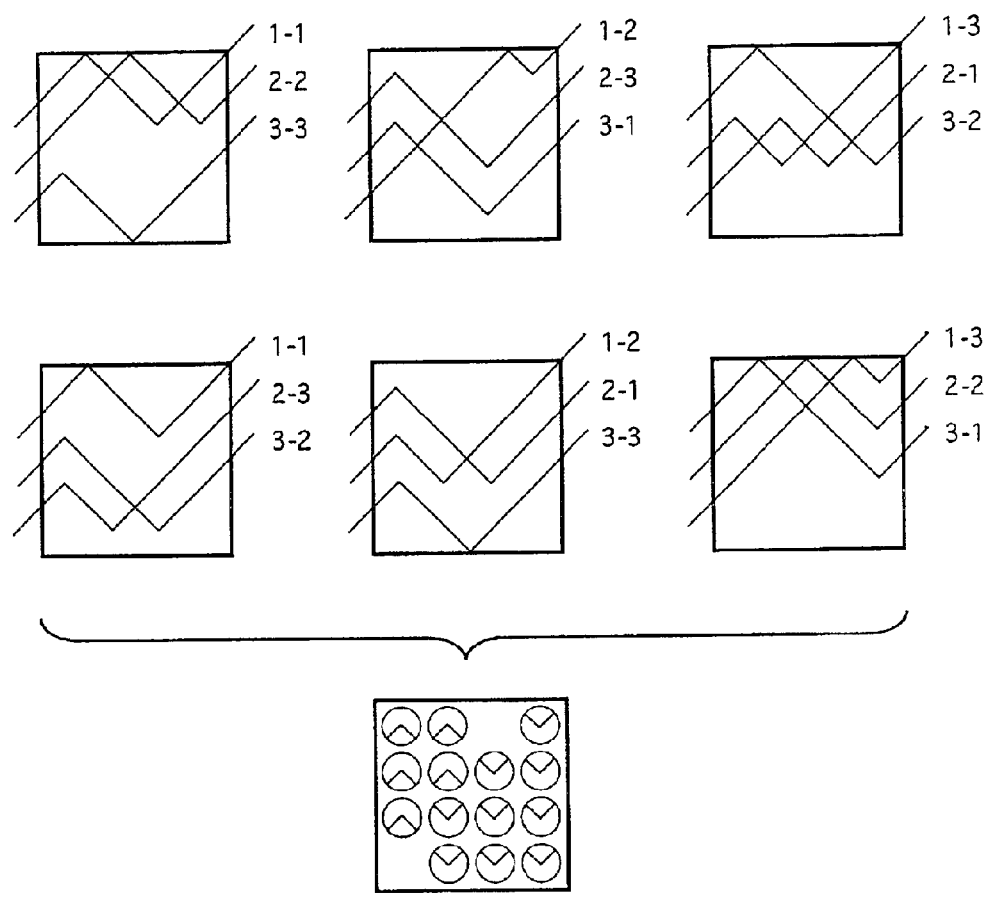
FIG. 36 is a schematic view showing all, or six kinds of switching conditions of a 3×3 optical switch according to the present invention.

FIG. 36 is a schematic view showing all switching conditions (six kinds of switching conditions) of a 3×3 optical switch according to the present invention. In each switching condition, the number of reflections is 2.

The switch size is 4×4 when the size of each switch cell is 1, and the optical path length is 4 when the diagonal length of each switch cell is 1. The number of switch cells is 13, and these 13 switch cells are classified into five switch cells having downward-only reflection mirrors and eight switch cells having upward-only reflection mirrors. It is not necessary to provide switch cells having bidirectional reflection mirrors.

Figure 37:
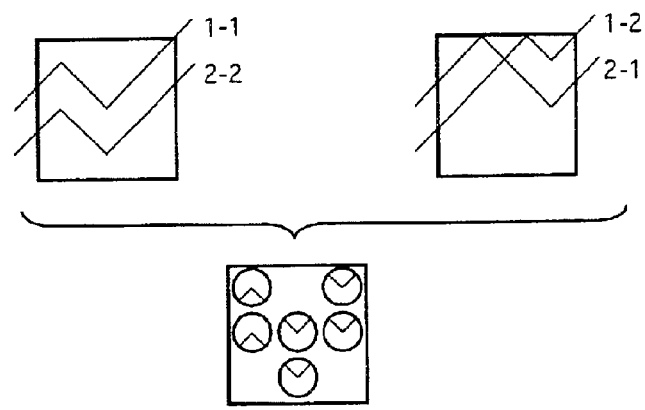
FIG. 37 is a schematic view showing all, or two kinds of switching conditions of a 2×2 optical switch according to the present invention.

FIG. 37 is a schematic view showing all switching conditions (two kinds of switching conditions) of a 2×2 optical switch according to the present invention. The switch size is 3×3 when the size of each switch cell is 1, and the optical path length is 3 when the diagonal length of each switch cell is 1.

The number of reflections on the mirror surfaces is always 2. The number of switch cells is 6, and these six switch cells are classified into two switch cells having downward-only reflection mirrors and four switch cells having upward-only reflection mirrors. It is not necessary to provide switch cells having bidirectional reflection mirrors.

Figure 38:
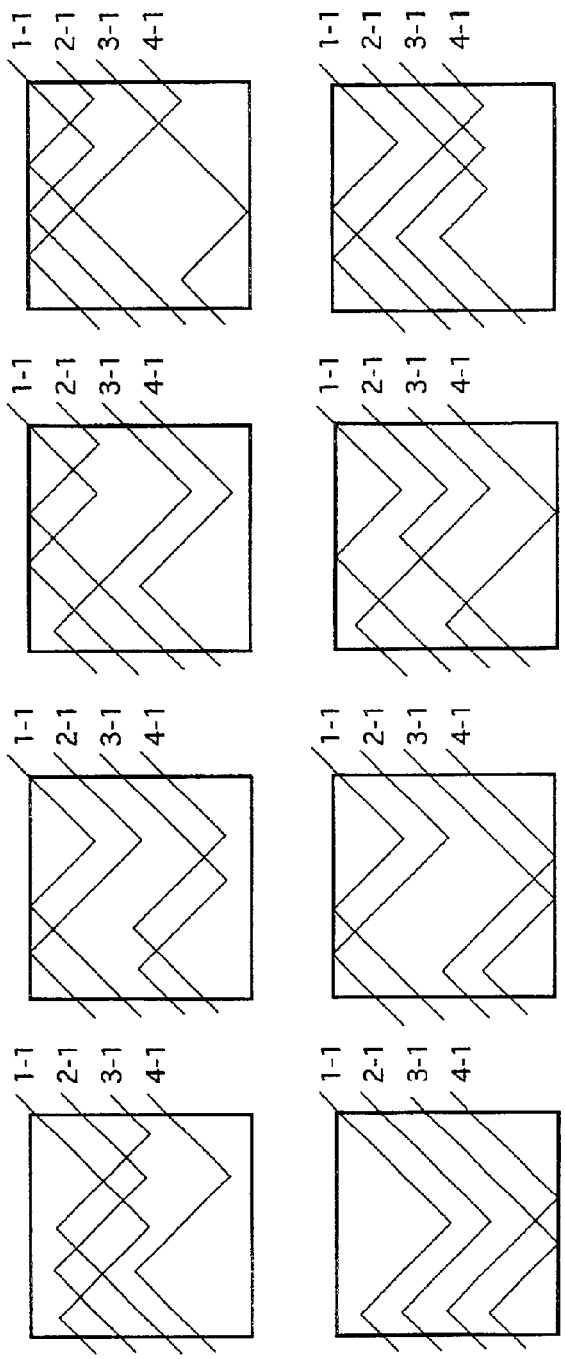
FIG. 38 is a schematic view showing a part of all, or 24 kinds of switching conditions of a 4×4 optical switch according to the present invention.
Figure 39:
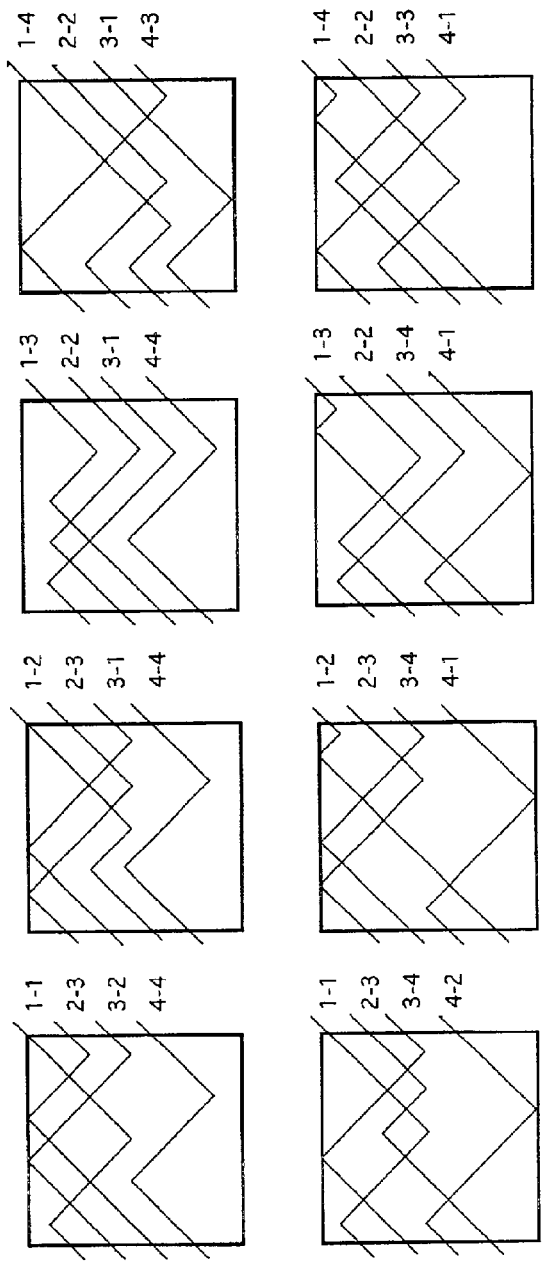
FIG. 39 is a schematic view showing another part of all, or 24 kinds of switching conditions of the 4×4 optical switch shown in FIG. 38.
Figure 40:
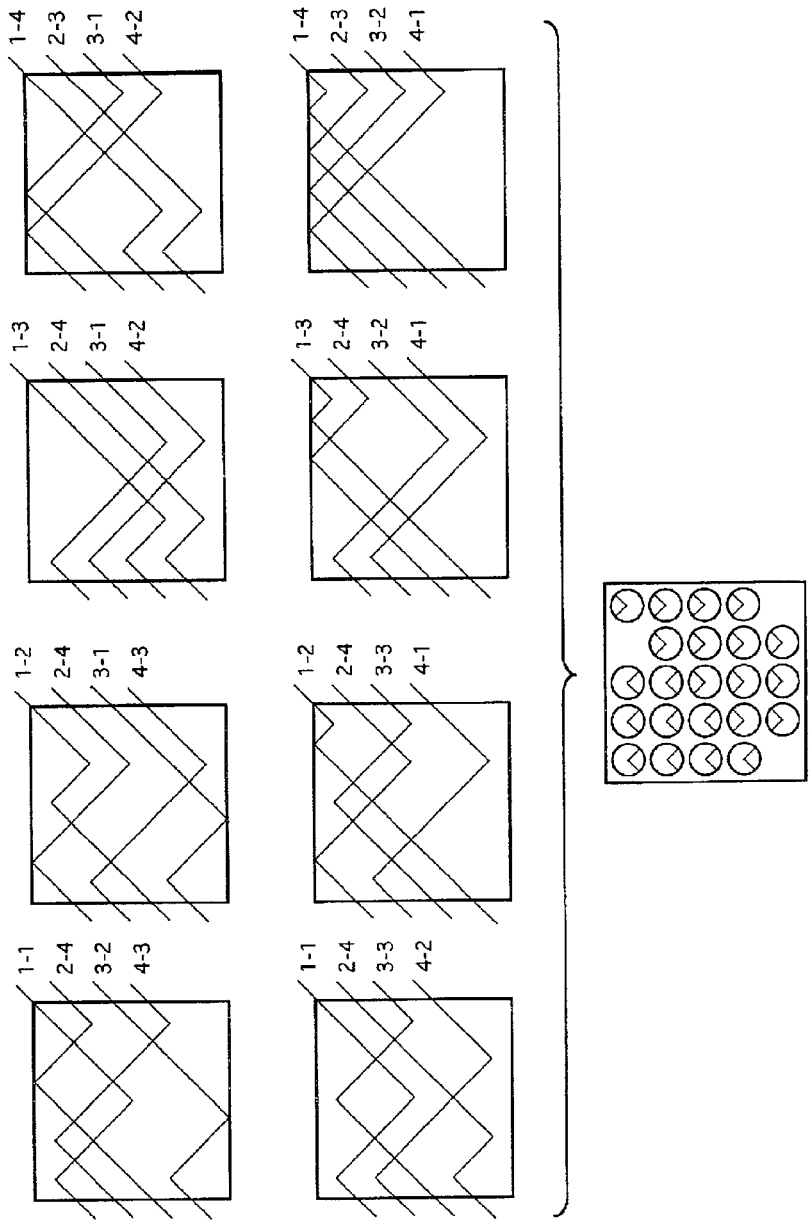
FIG. 40 is a schematic view showing the remaining part of all, or 24 kinds of switching conditions of the 4×4 optical switch shown in FIG. 38.

FIGS. 38 to 40 show all switching conditions (24 kinds of switching conditions) of a 4×4 optical switch according to the present invention. The switch size is 5×5 when the size of each switch cell is 1, and the optical path length is 5 when the diagonal length of each switch cell is 1. The number of reflections on the mirror surfaces is always 2. The number of switch cells is 22, and these 22 switch cells are classified into nine switch cells having downward-only reflection mirrors and 13 switch cells having upward-only reflection mirrors. It is not necessary to provide switch cells having bidirectional reflection mirrors.

Figure 41:
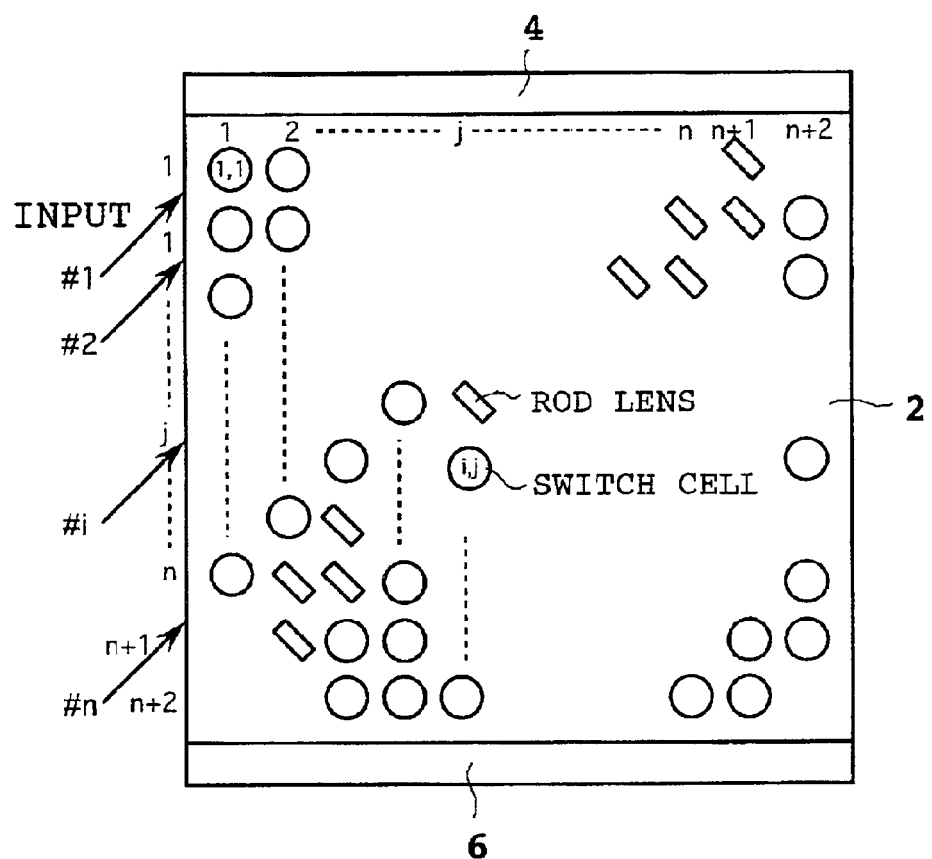
FIG. 41 is a schematic view showing an n×n optical switch obtained by adding a plurality of rod lenses to the optical switch shown in FIG. 35.

FIG. 41 shows an n×n optical switch obtained by adding a plurality of rod lenses to the configuration shown in FIG. 35. In the case that optical MEMS is adopted, there is a possibility that although a collimator lens is provided at each of the input fiber end and the output fiber end, the light beam may spread with an increase in optical path length, causing an increase in loss. To cope with this problem, it is effective to provide a rod lens that is easy to handle along each optical path in the optical switch.

In the preferred embodiment shown in FIG. 41, a plurality of switch cells are arranged in the form of an (n+2)×(n+2) square lattice, and a space for providing a plurality of rod lenses are defined along a diagonal line extending from the right upper corner to the left lower corner of the substrate 2.

The switch size is (n+2)×(n+2) when the size of each switch cell is 1, and the optical path length is (n+2) when the diagonal length of each switch cell is 1.

The number of all rod lenses is 2n, and the number of kinds of the rod lenses is n/2 (which will be hereinafter described in detail).

The number of all switch cells is ($n^2+2n-2$), in which the number of switch cells having downward-only reflection mirrors is (n+1)/2−1, and the number of switch cells having upward-only reflection mirrors is n(n+2)/2−1+n. It is not necessary to provide switch cells having bidirectional reflection mirrors. The number of mirror reflections is always 2 regardless of the optical paths.

The positions of the rod lenses are expressed as (1, n+1), (2, n), (2, n+1), . . . , (i, n−i+2), (i, n−i+3), . . . , (n, 2), (n, 3), and (n+1, 2).

Figure 42:
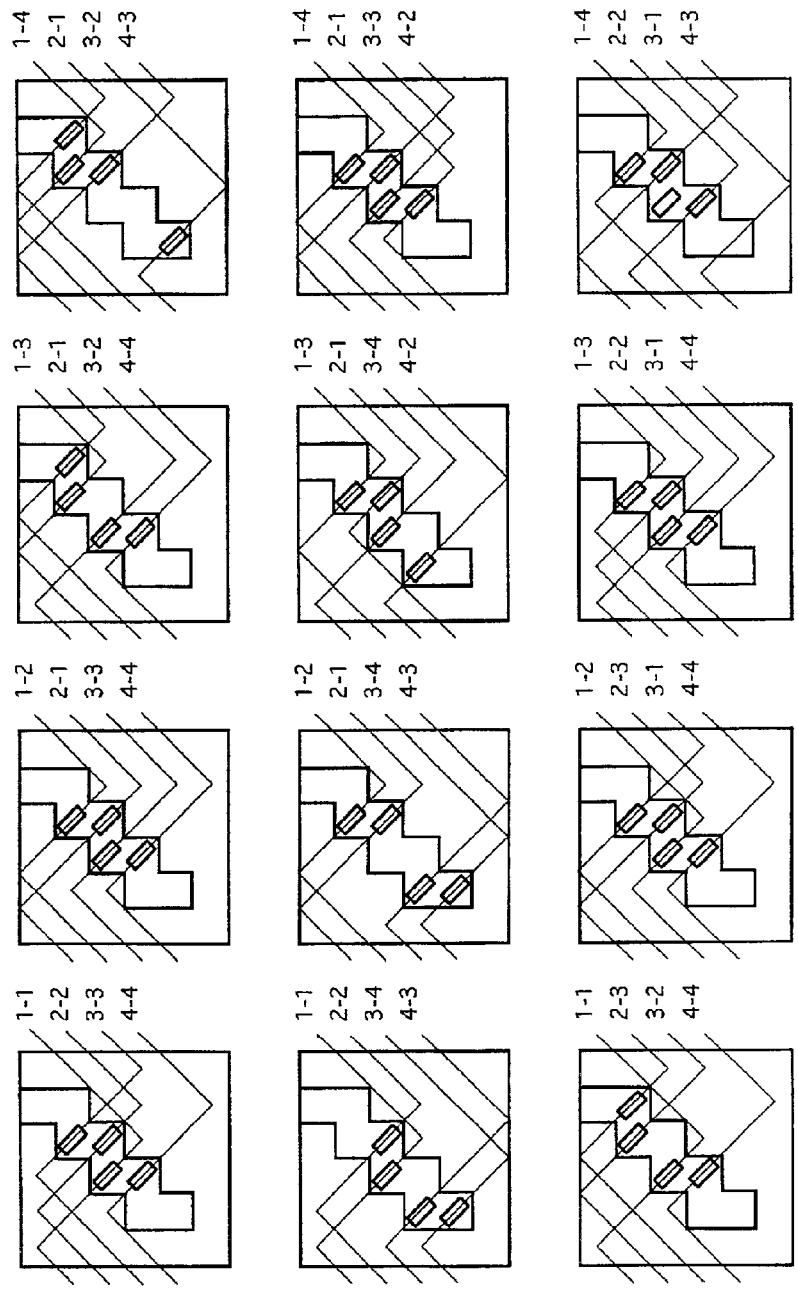
FIG. 42 is a schematic view showing a part of all, or 24 kinds of switching conditions of a 4×4 optical switch according to the present invention.
Figure 43:
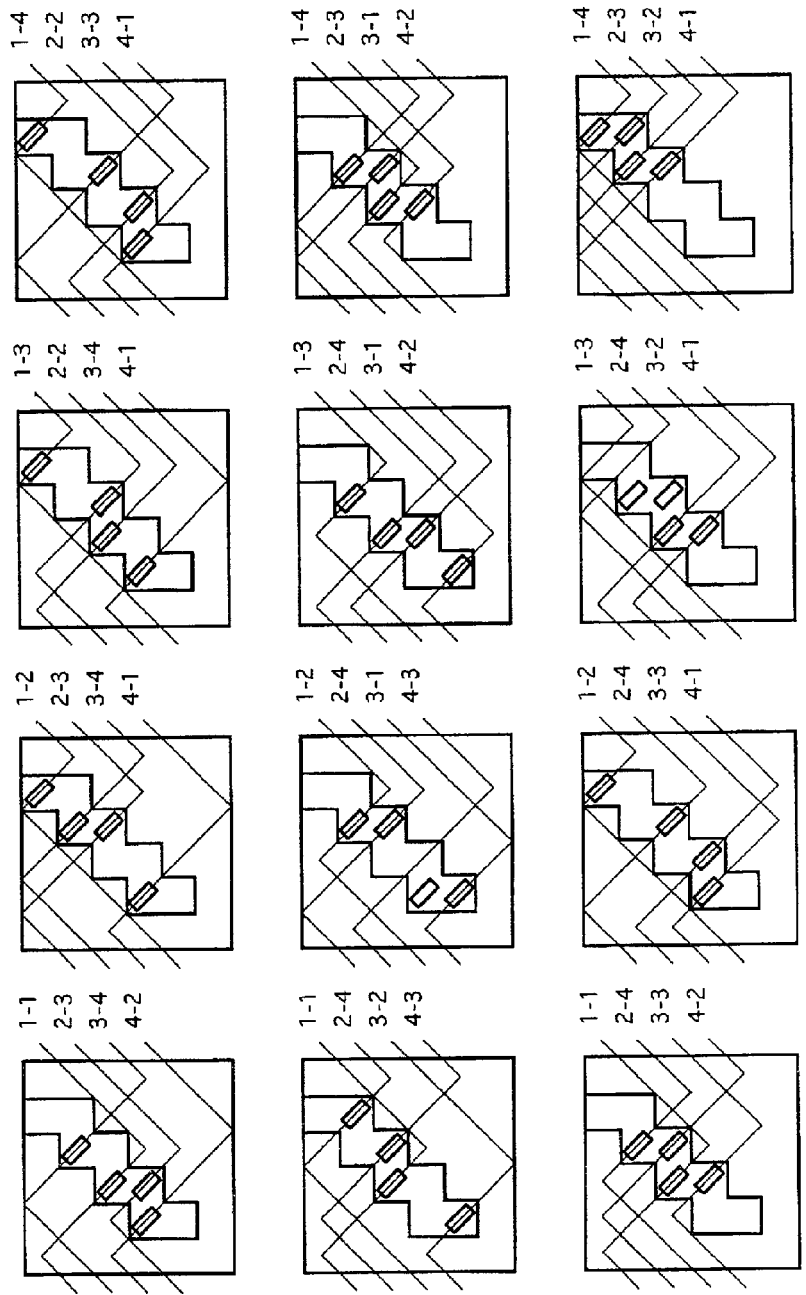
FIG. 43 is a schematic view showing the remaining part of all, or 24 kinds of switching conditions of the 4×4 optical switch shown in FIG. 42.

FIGS. 42 and 43 show all switching conditions (24 kinds of switching conditions) of a 4×4 optical switch according to the present invention. FIG. 44 is a schematic view for summarizing the conditions shown in FIGS. 42 and 43 to clarify the directions of reflection on the mirrors of the switch cells.

The switch size is 6×6 when the size of each switch cell is 1, and the optical path length is 6 when the diagonal length of each switch cell is 1. The number of reflections on the mirror surfaces is always 2.

The number of switch cells is 22, and these 22 switch cells are classified into nine switch cells having downward-only reflection mirrors and 13 switch cells having upward-only reflection mirrors. It is not necessary to provide switch cells having bidirectional reflection mirrors.

The kinds of the plural rod lenses will now be examined with reference to FIG. 45. Four rod lenses are arranged along optical paths provided by four collimating systems extending from four inputs to four outputs, respectively. The numbers of 1 to 4 shown in the rectangles representing the rod lenses are intended to distinguish the rod lenses.

In each channel, the optical path length is 5 when the diagonal length of each switch cell is 1. For example, in the channel #1, the ratio of the distance between the input fiber and the rod lens to the distance between the output fiber and the rod lens is 1:4. Similarly, the above ratios in the channels #2, #3, and #4 are 2:3, 3:2, and 4:1, respectively. Accordingly, the number of kinds of the rod lenses in relation to a focal length or the like is 2. In general, the number of kinds of rod lenses required in an n×n optical switch is n/2.

Figure 46:
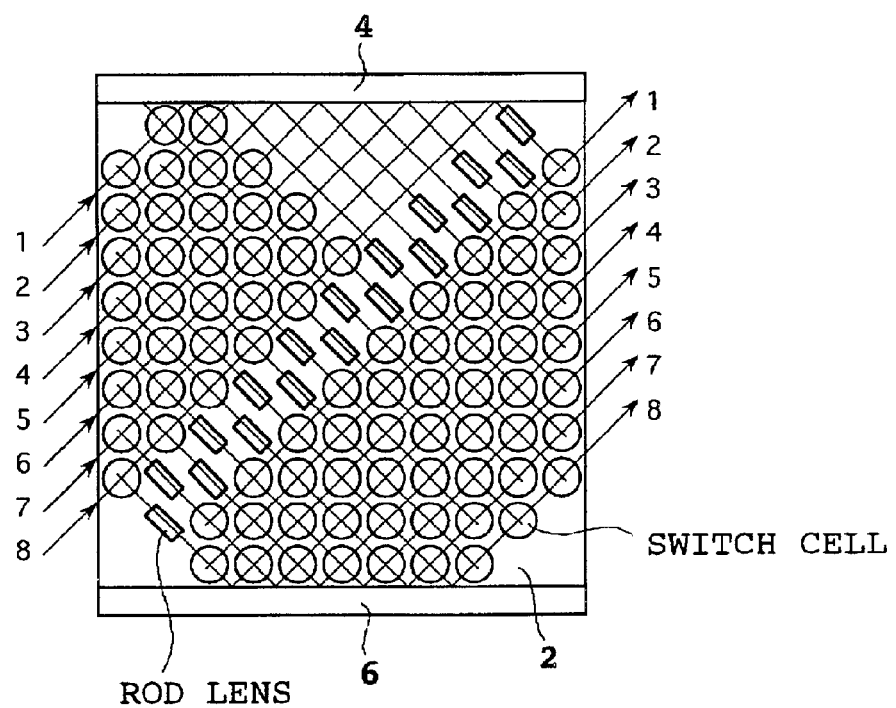
FIG. 46 is a schematic view showing an 8×8 optical switch according to the present invention.

FIG. 46 shows an 8×8 optical switch according to the present invention. This optical switch is a nonblocking optical switch in which the number of reflections is always 2 regardless of the optical paths as in the previous preferred embodiments. The operation of this optical switch will now be described with reference to FIGS. 47 and 48.

Figure 47:
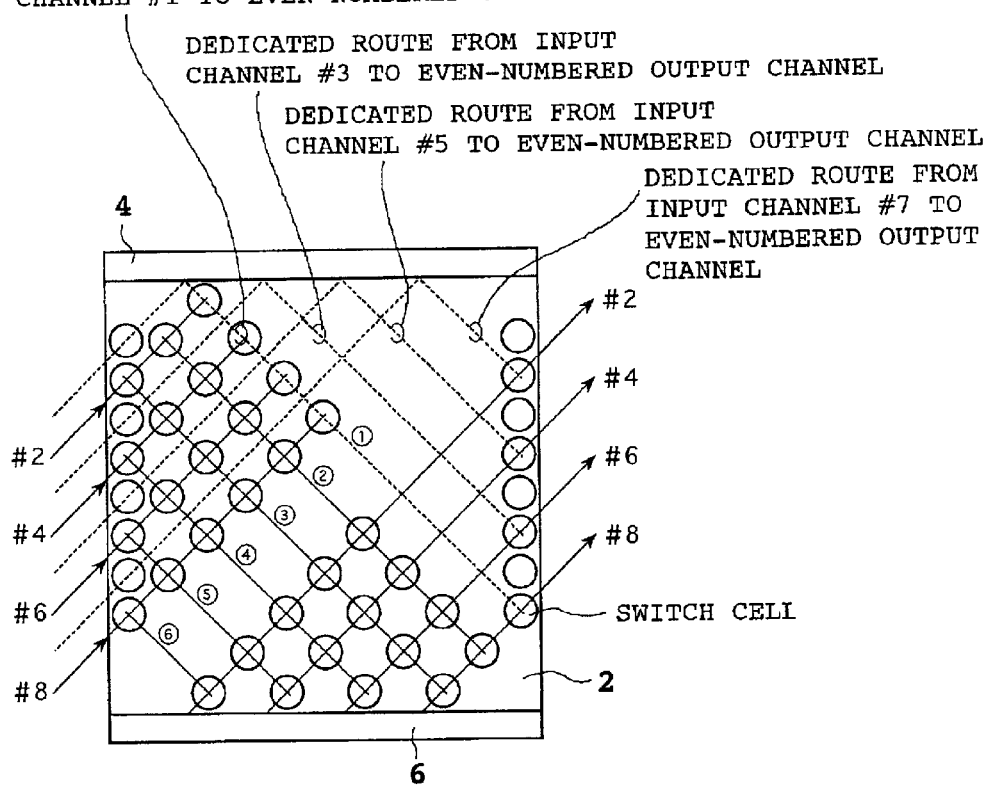
FIG. 47 is a schematic view for illustrating the operation of the optical switch shown in FIG. 46.

First, consider the case that the input channels are even-numbered channels and the output channels are even-numbered channels as shown in FIG. 47. The broken lines in FIG. 47 show routes formed by connecting the odd-numbered input channels to the even-numbered output channels. These routes are dedicated routes respectively corresponding to the odd-numbered input channels, and are reflected on the mirror 4. The solid lines in FIG. 47 show routes formed by connecting the even-numbered input channels to the even-numbered output channels. These routes are classified as follows:

(a) Three routes allowed to reach the output channels #2, #4, #6, and #8 (routes (1), (2), and (3) shown in FIG. 47). Route (1) is also a route dedicated to the input channel #1.

(b) One route allowed to reach the output channels #2, #4, and #6 (route (4) shown in FIG. 47).

(c) One route allowed to reach the output channels #2 and #4 (route (5) shown in FIG. 47).

(d) One route allowed to reach the output channel #2 only (route (6) shown in FIG. 47).

The allowed routes are summarized according to the even-numbered input channels in Table shown at a lower portion of FIG. 47. In considering that the most congestive routes are routes from the input channel #8 to the output channel #8, from the input channel #6 to the output channel #6, from the input channel #4 to the output channel #4, and from the input channel #2 to the output channel #2, it is understood that the three routes allowed to reach the output channels #2, #4, #6, and #8 are sufficient.

Accordingly, it is sufficient to arrange the switch cells so that the routes (1), (2), and (3) can be used.

Although the route (1) is also a route dedicated to the input channel #1, the even-numbered output channels are allocated to the even-numbered input channels, and the route (1) is therefore not necessary. Accordingly, the route (1) may be used for the even-numbered input channels.

With this arrangement of the switch cells, the switch size becomes 11×11 by upward increasing one row and downward increasing two rows.

Next, consider the case that the input channels are odd-numbered channels and the output channels are odd-numbered channels as shown in FIG. 48. The broken lines in FIG. 48 show routes formed by connecting the even-numbered input channels to the odd-numbered output channels. These routes are dedicated routes respectively corresponding to the even-numbered input channels, and are reflected on the mirror 4.

The solid lines in FIG. 48 show routes formed by connecting the odd-numbered input channels to the odd-numbered output channels. These routes are five routes. As understood from Table shown at a lower portion of FIG. 48, it is sufficient to ensure two routes allowed to reach the output channels #1, #3, #5, and #7. This two routes are automatically attained by setting the routes connecting the even-numbered input channels to the even-numbered output channels. Accordingly, the switch size can be easily examined.

There will now be considered an n×n optical switch according to the present invention. The most important point is how many routes allowed to lead from the input channel #2 to the output channel #n are required. As understood from FIG. 49, the number of these required routes is $(n/4+1)$. In the case that n is not a multiple of 4, $(n-2)$ may be substituted for n.

Figure 49:
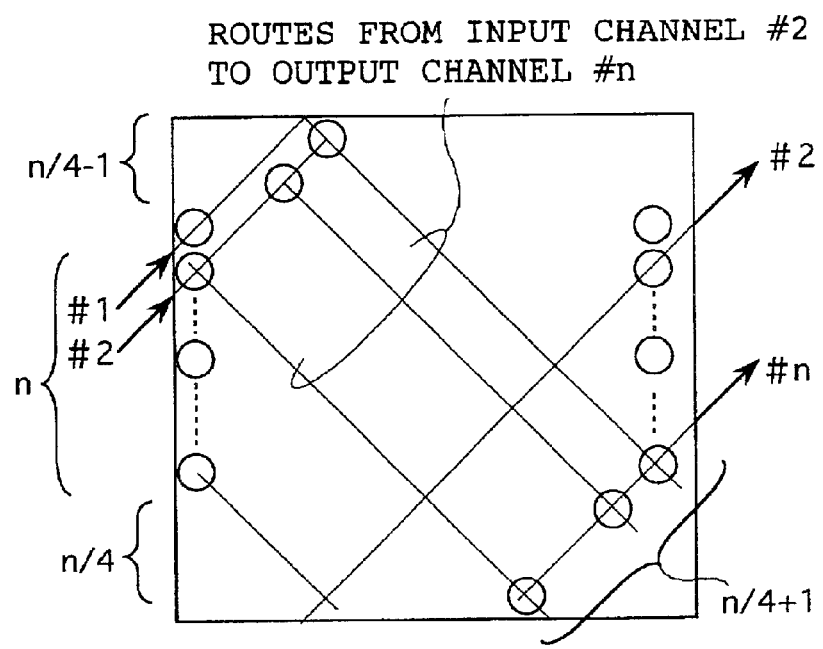
FIG. 49 is a schematic view showing an n×n optical switch according to the present invention.

The size of a square lattice forming this optical switch (the length of each side of the square lattice) required to obtain the above number of required routes is $n+(n/4-1)+(n/4)=(1.5n-1)$ as apparent from FIG. 49. When n is large, this size becomes substantially equal to 1.5n. Accordingly, this configuration will be hereinafter referred to as "1.5n square lattice".

The (n+1) square lattice type shown in FIG. 35, for example, corresponds to the case where n is 6 or less in the 1.5n square lattice type. The number of switch cells will now be considered.

Figure 50:
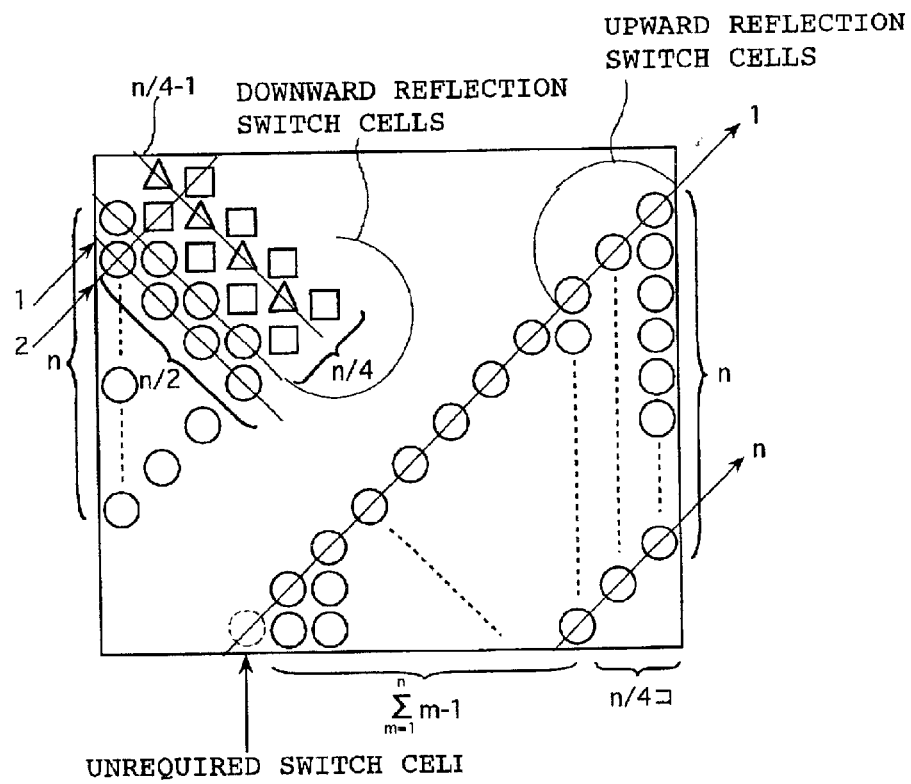
FIG. 50 is a schematic view for illustrating the number of switch cells with the associated equations for calculation thereof.

As understood from the equations in FIG. 50, the number of switch cells having upward-only reflection mirrors is $(3n^2/4+n/2-1)$, and the number of switch cells having downward-only reflection mirrors is $(n^2/2)$. Accordingly, the number of all switch cells is $(5n^2/4+n/2-1)$.

A space for arranging beam condensing means such as rod lenses in the optical switch is defined when n is 8 or more. In this case, the number of lenses is $(5n/2-2)$.

In the case that n is a multiple of 4 in the preferred embodiment shown in FIG. 49, the switch size is $(3n/2-1)\times(3n/2-1)$, and in the case that n is not a multiple of 4, the switch size is $(3n/2-2)\times(3n/2-2)$. The switch size is larger by $(n/2-1)$ than the switch size of n×n.

Table 1 shows the relation among the number of input and output channels, the number of routes from the input channel #2 to the output channel #n, the size increase, and the switch size in the preferred embodiment shown in FIG. 49, for example.

TABLE 1

| Number of input and output channels | 4 × 4 | 6 × 6 | 8 × 8 | 10 × 10 | 12 × 12 | 14 × 14 | 16 × 16 | 18 × 18 | 20 × 20 |
|---|---|---|---|---|---|---|---|---|---|
| Number of routes from input channel #2 to output channel #n | 2 | 2 | 3 | 3 | 4 | 4 | 5 | 5 | 10 |
| Size increase | +1 | +1 | +3 | +3 | +5 | +5 | +7 | +7 | +9 |
| Switch size | 5 × 5 | 7 × 7 | 11 × 11 | 13 × 13 | 17 × 17 | 19 × 19 | 23 × 23 | 25 × 25 | 29 × 29 |

While the mirrors 4 and 6 are used as fixed mirrors, switch cells may be positioned on the reflection points according to another preferred embodiment of the present invention. Further, while n is an even number in an n×n optical switch in the above description, a similar function can be obtained also in the case that n is an odd number.

Figure 51:
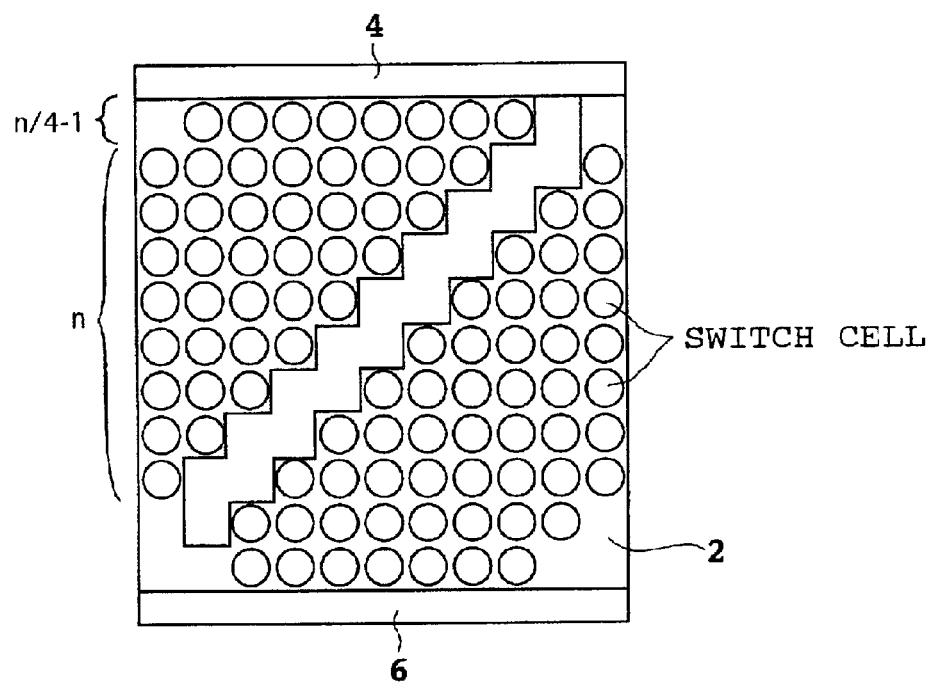
FIG. 51 is a schematic view for illustrating a lens region for arranging lenses.

In the case that n is 8 or more, a lens region for arranging beam condensing means such as rod lenses is defined on the substrate 2 as shown in FIG. 51. As apparent from FIG. 51, the number of lenses is $(5n/2-2)$.

The configurations of the various preferred embodiments of the present invention are compared in Table 2 and 3.

According to the present invention as described above, it is possible to provide an optical switch which can be reduced in size and can eliminate path dependence of loss.

The effects obtained by the specific preferred embodiments of the present invention have been described above, so that the description thereof will be omitted herein.

The present invention is not limited to the details of the above described preferred embodiments. The scope of the invention is defined by the appended claims and all changes and modifications as fall within the equivalence of the scope of the claims are therefore to be embraced by the invention.

TABLE 2

|  |  | Square lattice basic type | | Square lattice A type | | Square lattice B type | | Square lattice with spherical lenses type | | Square lattice with rod lenses type | |
| --- | --- | --- | --- | --- | --- | --- | --- | --- | --- | --- | --- |
| Number of input and output channels | | $4 \times 4$ | $n \times n$ | $4 \times 4$ | $n \times n$ | $4 \times 4$ | $n \times n$ | $4 \times 4$ | $n \times n$ | $4 \times 4$ | $n \times n$ |
| Size | | $4 \times 4$ | $n \times n$ | $4 \times 4$ | $n \times n$ | $4 \times 4$ | $n \times n$ | $4 \times 5$ | $n \times (n+1)$ | $5 \times 6$ | $(n+1) \times (n+2)$ |
| Number of switch cells | | 16 | $n^2$ | 16 | $n^2$ | 16 | $n^2$ | 16 | $n^2$ | 20 | $n \times (n+1)$ |
| Optical path length | | 4 | n | 4 | n | 4 | n | 5 | $n+1$ | 6 | $n+2$ |
| Number of reflections | | 2 or 4 or 1 | 2 or 4 or 1 | 1 or 3 | 1 or 3 | 0 or 2 or 4 | 0 or 2 or 4 | 2 or 4 or 6 | 2 or 4 or 6 | 2 or 4 | 2 or 4 |
| Kinds of switch mirrors | Upward reflection | 5 | $n+1$ | 8 | $n^2/2$ | 8 | $n^2/2$ | 4 | n | 6 | $2n-2$ |
| | Downward reflection | 5 | $n+1$ | 8 | $n^2/2$ | 8 | $n^2/2$ | 4 | n | 6 | $2n-2$ |
| | Birdirectional reflection | 6 | $n^2-2n-2$ | — | — | — | — | 8 | $n^2-2n$ | 8 | $n^2-3n+4$ |
| | Simultaneous birdirectional reflection | — | — | — | — | — | — | 5 | all | — | — |
| Insertion of lenses | Lens type | — | — | — | — | — | — | Spherical lens | Spherical lens | Rod lens | Rod lens |
| | Number of lenses | — | — | — | — | — | — | 4 | n | 8 | $2n$ |
| Remarks | | | *1 | | *2 | | *3 | | | | |

*1: Blocking
*2: Input optical paths of odd and even channels are crossed, and optical paths of odd and even channels are crossed. Nonblocking
*3: Switch logic in the first column and the N-th column for odd channels is inverted. Nonblocking

TABLE 3

|  |  | V-shaped arranged type | | $(n+1)$ square lattice type | | $(n+1)$ square lattice with rod lenses type | | 1.5n square lattice type | |
| --- | --- | --- | --- | --- | --- | --- | --- | --- | --- |
| Number of input and output channels | | $4 \times 4$ | $n \times n$ | $4 \times 4$ | $n \times n$ | $4 \times 4$ | $n \times n$ | $4 \times 4$ | $n \times n$ |
| size | | $6 \times 6$ | $2(n-1)$ | $5 \times 5$ | $(n+1) \times (n+1)$ | $6 \times 6$ | $(n+2) \times (n+2)$ | $5 \times 5$ | $(1.5n-1) \times (1.5n-1)$ |
| Number of switch cells | | 19 | $n^2+n-1$ | 22 | $n^2+2n-2$ | 22 | $n^2+2n-2$ | 22 | $1.25n^2+0.5n-1$ |
| Optical path length | | 6 | $2(n-1)$ | 5 | $n+1$ | 6 | $n+2$ | 5 | $1.5n-1$ |
| Number of reflections | | 2 | 2 | 2 | 2 | 2 | 2 | 2 | 2 |
| Kinds of switch mirrors | Upward reflection | 15 | $n^2-1$ | 13 | $n(n+1)/2-1+n$ | 13 | $n(n+1)/2-1+n$ | 13 | $0.75n^2+0.5n-1$ |
| | Downward reflection | 4 | n | 9 | $n(n+1)/2-1$ | 9 | $n(n+1)/2-1$ | 9 | $0.5n^2$ |
| | Birdirectional reflection | — | — | — | — | — | — | — | — |
| | Simultaneous birdirectional reflection | — | — | — | — | — | — | — | — |
| Insertion of lenses | Lens type | — | Rod lens | — | — | Rod lens | Rod lens | — | Rod lens |
| | Number of lenses | — | $2n$ | — | — | 8 | $2n$ | — | $2.5n-2$ |
| Remarks | | | *4 | | *5 | | | | *6 |

*4: In the case of n > 5, rod lenses can be inserted. Nonblocking
*5: Corresponding to the case where n is 6 or less in the 1.5n square lattice type. Blocking
*6: In the case that n > 8, rod lenses can be inserted. Blocking

What is claimed is:

1. An optical switch having a plurality of switch cells, wherein:

said optical switch has n inputs (n is a natural number) and m outputs (m is a natural number);

said optical switch has a unit size defined as the distance between any two adjacent ones of said switch cells;

said optical switch comprises;

a substrate having a switch size of K×L (K is an integer satisfying n≦K, and L is an integer satisfying m≦L);

first and second mirrors parallel to each other and perpendicular to a principal surface of said substrate; and an optical unit including a plurality of input optical paths for said n inputs and a plurality of output optical paths for said m outputs, said plurality of input optical paths being inclined relative to said first and second mirrors, said plurality of output optical paths being inclined relative to said first and second mirrors; and each of said switch cells comprises a switch mirror provided movably relative to said substrate; wherein said switch mirror can switch between a first condition where incident light passes over the switch mirror and a second condition where light is reflected by the switch mirror.

2. An optical switch comprising:

a plurality of optical path switching means to arbitrarily guide light from a plurality of input ports to a plurality of output ports, each of said plurality of optical path switching means including a movable optical reflecting member; and reflecting means for reflecting light from said input ports or light from said moveable optical reflecting members toward said output ports or said moveable optical reflecting members; wherein each of said moveable optical members can switch between a first condition where incident light passes over the moveable optical reflecting member and a second condition where incident light is reflected by the moveable optical.

3. An optical switch comprising:

a plurality of optical path switching means to arbitrarily guide light from a plurality of input ports to a plurality of output ports, each of said plurality of optical path switching means including a movable optical reflecting member; and reflecting means on opposite sides of said moveable optical reflecting member for reflecting light from said input ports or light from said moveable optical reflecting member toward said output ports or said moveable optical reflecting member; wherein the optical path lengths from said input ports to said output ports being equal, and said moveable optical reflecting member can switch between a first condition where incident light passes over the moveable optical reflecting member and a second condition where incident light is reflected by the moveable optical reflecting member.

4. An optical switch comprising:

a plurality of optical path switching means arranged to arbitrarily guide light from a plurality of input ports to a plurality of output ports, each of said plurality of optical path switching means including a movable optical reflecting member; and reflecting means on opposite sides of said moveable optical reflecting member for reflecting light from said input ports or light from said moveable optical reflecting member toward said output ports or said moveable optical reflecting member; wherein the optical losses from said input ports to said output ports equal; and said moveable optical reflecting member can switch between a first condition where incident light passes over the moveable optical reflecting member and a second condition where incident light is reflected by the moveable optical reflecting member.

5. An optical switch comprising:

a plurality of optical input ports;

a plurality of optical output ports;

a plurality of optical path switching means provided between said plurality of optical input ports and said plurality of optical output ports, each of said plurality of optical path switching means including a movable optical reflecting member; and reflecting means provided outside of said plurality of optical path switching means between said plurality of optical input ports and said plurality of optical output ports for reflecting light from said optical input ports or light from said optical path switching means; wherein said moveable optical reflecting member can switch between a first condition where incident light passes over the moveable optical reflecting member and a second condition where incident light is reflected by the moveable optical reflecting member.

6. An optical switch comprising:

a plurality of optical input ports;

a plurality of optical output ports;

a plurality of optical path switching means provided between said plurality of optical input ports and said plurality of optical output ports, each of said plurality of optical path switching means including a movable optical reflecting member; and reflecting means provided between said plurality of optical input ports and said plurality of optical output ports so as to interpose said plurality of optical path switching means for reflecting light from said optical input ports or light from said optical path switching means wherein said moveable optical reflecting member can switch between a first condition where incident light passes over the moveable optical reflecting member and a second condition where incident light is reflected by the moveable optical reflecting member.

7. An optical switch comprising:

a plurality of optical input ports;

a plurality of optical output ports;

a plurality of optical path switching means provided between said plurality of optical input ports and said plurality of optical output ports, each of said plurality of optical path switching means including a movable optical reflecting member;

reflecting means on opposite sides of said moveable optical reflecting member for reflecting light from said input ports or light from said optical reflecting member toward said output ports or said optical reflecting member; and optical inputs from said optical input ports to adjacent ones of said optical path switching means crossing each other in direction; wherein said moveable optical reflecting member can switch between a first condition where incident light passes over the moveable optical reflecting member and a second condition where incident light is reflected by the moveable optical reflecting member.

8. An optical switch comprising:

a plurality of optical input ports;

a plurality of optical output ports; and a plurality of optical path switching means provided between said plurality of optical input ports and said plurality of optical output ports, each of said plurality of optical path switching means including a movable optical reflecting member;

reflecting means on opposite sides of said moveable optical reflecting member for reflecting light from said input ports or light from said moveable optical reflecting member toward said optical output ports or said moveable optical reflecting member, wherein adjacent ones of said optical path switching means for receiving light from said optical input ports are reversed to each other, and said moveable optical reflecting member can switch between a first condition where incident light passes over the moveable optical reflecting member and a second condition where incident light is reflected by the moveable optical reflecting member.

9. An optical switch, including optical input ports and optical output ports, comprising:

a plurality of optical path switches, between the optical input ports and the optical output ports, each including a movable optical reflecting member; and a pair of mirrors on opposite sides of the movable optical reflecting member to reflect light from the optical input ports and from the movable optical reflecting member toward the optical output ports and the movable optical reflecting member; wherein said movable optical reflecting member can switch between a first condition where incident light passes over the movable optical reflecting member and a second condition where incident light is reflected by the movable optical reflecting member.

10. An optical switch, including optical input ports and optical output ports, comprising:

a plurality of optical path switches, between the optical input ports and the optical output ports, each including a movable optical reflecting member; and a pair of mirrors on opposite sides of the movable optical reflecting member to reflect light from the optical input ports and from the movable optical reflecting member toward the optical output ports and the movable optical reflecting member; wherein the optical path switches, which are connected to the optical input ports, are alternately inverted in logic, the optical path switches, which are connected to the optical output ports, are alternately inverted in logic, and said movable optical reflecting member can switch between a first condition where incident light passes over the movable optical reflecting member and a second condition where incident light is reflected by the movable optical reflecting member.

* * * * *

UNITED STATES PATENT AND TRADEMARK OFFICE
CERTIFICATE OF CORRECTION

| | |
|---|---|
| PATENT NO. | : 6,907,154 B2 |
| APPLICATION NO. | : 09/924606 |
| DATED | : June 14, 2005 |
| INVENTOR(S) | : Yoichi Oikawa et al. |

It is certified that error appears in the above-identified patent and that said Letters Patent is hereby corrected as shown below:

Column 19, Line 60, change "comprises;" to --comprises:--.

Column 20, Line 56, change "substrate;" to --substrate,--.

Column 20, Line 58, after "where" insert --incident--.

Column 20, Line 67, change "moveable" to --movable--.

Column 20, Line 67, change "members" to --member--.

Column 21, Line 1, change "moveable" to --movable--.

Column 21, Line 2, change "members;" to --members--.

Column 21, Line 3, change "moveable" to --movable--.

Column 21, Line 5, change "moveable" to --movable--.

Column 21, Line 7, change "moveable" to --movable--.

Column 21, Line 15, change "moveable" to --movable--.

Column 21, Line 17, change "moveable" to --movable--.

Column 21, Line 18, change "moveable" to --movable--.

Column 21, Line 19, change "member;" to --member,--.

Column 21, Line 21, change "moveable" to --movable--.

Column 21, Line 21, change "being" to --are--.

Column 22, Line 12, change "moveable" to --movable--.

Column 22, Line 14, change "moveable" to --movable--.

Column 22, Line 16, change "moveable" to --movable--.

Column 22, Line 26, change "moveable" to --movable--.

Column 22, Line 33, change "direction;" to --direction,--.

UNITED STATES PATENT AND TRADEMARK OFFICE
CERTIFICATE OF CORRECTION

PATENT NO. : 6,907,154 B2
APPLICATION NO. : 09/924606
DATED : June 14, 2005
INVENTOR(S) : Yoichi Oikawa et al.

It is certified that error appears in the above-identified patent and that said Letters Patent is hereby corrected as shown below:

Column 22, Line 34, change "moveable" to --movable--.

Column 22, Line 36, change "members" to --member--.

Column 22, Line 38, change "moveable" to --movable--.

Column 22, Line 46, after "member" insert --and--.

Column 22, Line 47, change "moveable" to --movable--.

Column 22, Line 50, change "moveable" to --movable--.

Column 22, Line 52, change "moveable" to --movable--.

Column-22, Line 56, change "moveable" to --movable--.

Column 22, Line 58, change "moveable" to --movable--.

Column 22, Line 60, change "moveable" to --movable--.

Column 23, Line 3, change "member;" to --member,--.

Column 24, Line 3, change "member;" to --member,--.

Signed and Sealed this

First Day of May, 2007

JON W. DUDAS
*Director of the United States Patent and Trademark Office*

UNITED STATES PATENT AND TRADEMARK OFFICE
CERTIFICATE OF CORRECTION

PATENT NO. : 6,907,154 B2
APPLICATION NO. : 09/924606
DATED : June 14, 2005
INVENTOR(S) : Yoichi Oikawa et al.

It is certified that error appears in the above-identified patent and that said Letters Patent is hereby corrected as shown below:

Column 19, Line 60, change "comprises;" to --comprises:--.

Column 20, Line 56, change "substrate;" to --substrate,--.

Column 20, Line 58, after "where" insert --incident--.

Column 20, Line 67, change "moveable" to --movable--.

Column 20, Line 67, change "members" to --member--.

Column 21, Line 1, change "moveable" to --movable--.

Column 21, Line 2, change "members;" to --members--.

Column 21, Line 3, change "moveable" to --movable--.

Column 21, Line 5, change "moveable" to --movable--.

Column 21, Line 7, change "moveable" to --movable--.

Column 21, Line 15, change "moveable" to --movable--.

Column 21, Line 17, change "moveable" to --movable--.

Column 21, Line 18, change "moveable" to --movable--.

Column 21, Line 19, change "member;" to --member,--.

Column 21, Line 21, change "moveable" to --movable--.

Column 21, Line 21, change "being" to --are--.

Column 21, Line 23, change "moveable" to --movable--.

Column 21, Line 25, change "moveable" to --movable--.

Column 21, Line 33, change "moveable" to --movable--.

Column 21, Line 35, change "moveable" to --movable--.

Column 21, Line 36, change "members" to --member--.

UNITED STATES PATENT AND TRADEMARK OFFICE
CERTIFICATE OF CORRECTION

| | |
|---|---|
| PATENT NO. | : 6,907,154 B2 |
| APPLICATION NO. | : 09/924606 |
| DATED | : June 14, 2005 |
| INVENTOR(S) | : Yoichi Oikawa et al. |

It is certified that error appears in the above-identified patent and that said Letters Patent is hereby corrected as shown below:

Column 21, Line 37, change "moveable" to --movable--.

Column 21, Line 38, after "ports" insert --are--.

Column 21, Line 39, change "equal;" to --equal,--.

Column 21, Line 40, change "moveable" to --movable--.

Column 21, Line 42, change "moveable" to --movable--.

Column 21, Line 45, change "moveable" to --movable--.

Column 21, Line 48, change "moveable" to --movable--.

Column 21, Line 58, change "moveable" to --movable--.

Column 21, Line 59, change "moveable" to --movable--.

Column 21, Line 61, change "moveable" to --movable--.

Column 21, Line 64, change "moveable" to --movable--.

Column 22, Line 10, change "means" to --means,--.

Column 22, Line 12, change "moveable" to --movable--.

Column 22, Line 14, change "moveable" to --movable--.

Column 22, Line 16, change "moveable" to --movable--.

Column 22, Line 26, change "moveable" to --movable--.

Column 22, Line 33, change "direction;" to --direction,--.

Column 22, Line 34, change "moveable" to --movable--.

Column 22, Line 36, change "members" to --member--.

Column 22, Line 38, change "moveable" to --movable--.

Column 22, Line 46, after "member" insert --and--.

UNITED STATES PATENT AND TRADEMARK OFFICE
CERTIFICATE OF CORRECTION

PATENT NO. : 6,907,154 B2
APPLICATION NO. : 09/924606
DATED : June 14, 2005
INVENTOR(S) : Yoichi Oikawa et al.

It is certified that error appears in the above-identified patent and that said Letters Patent is hereby corrected as shown below:

Column 22, Line 47, change "moveable" to --movable--.

Column 22, Line 50, change "moveable" to --movable--.

Column 22, Line 52, change "moveable" to --movable--.

Column 22, Line 56, change "moveable" to --movable--.

Column 22, Line 58, change "moveable" to --movable--.

Column 22, Line 60, change "moveable" to --movable--.

Column 23, Line 3, change "member;" to --member,--.

Column 24, Line 3, change "member;" to --member,--.

This certificate supersedes Certificate of Correction issued May 1, 2007.

Signed and Sealed this

Seventh Day of August, 2007

JON W. DUDAS
*Director of the United States Patent and Trademark Office*

UNITED STATES PATENT AND TRADEMARK OFFICE
CERTIFICATE OF CORRECTION

PATENT NO.       : 6,907,154 B2
APPLICATION NO. : 09/924606
DATED            : June 14, 2005
INVENTOR(S)      : Yoichi Oikawa et al.

It is certified that error appears in the above-identified patent and that said Letters Patent is hereby corrected as shown below:

Column 19, Line 60, change "comprises;" to --comprises:--.

Column 20, Line 56, change "substrate;" to --substrate,--.

Column 20, Line 58, after "where" insert --incident--.

Column 20, Line 67, change "moveable" to --movable--.

Column 20, Line 67, change "members" to --member--.

Column 21, Line 1, change "moveable" to --movable--.

Column 21, Line 2, change "members;" to --members,--.

Column 21, Line 3, change "moveable" to --movable--.

Column 21, Line 5, change "moveable" to --movable--.

Column 21, Line 7, change "moveable" to --movable--.

Column 21, Line 15, change "moveable" to --movable--.

Column 21, Line 17, change "moveable" to --movable--.

Column 21, Line 18, change "moveable" to --movable--.

Column 21, Line 19, change "member;" to --member,--.

Column 21, Line 21, change "moveable" to --movable--.

Column 21, Line 21, change "being" to --are--.

Column 21, Line 23, change "moveable" to --movable--.

Column 21, Line 25, change "moveable" to --movable--.

Column 21, Line 33, change "moveable" to --movable--.

Column 21, Line 35, change "moveable" to --movable--.

Column 21, Line 36, change "moveable" to --movable--.

UNITED STATES PATENT AND TRADEMARK OFFICE
CERTIFICATE OF CORRECTION

| | |
|---|---|
| PATENT NO. | : 6,907,154 B2 |
| APPLICATION NO. | : 09/924606 |
| DATED | : June 14, 2005 |
| INVENTOR(S) | : Yoichi Oikawa et al. |

It is certified that error appears in the above-identified patent and that said Letters Patent is hereby corrected as shown below:

Column 21, Line 37, change "member;" to --member,--.

Column 21, Line 38, after "ports" insert --are--.

Column 21, Line 39, change "equal;" to --equal,--.

Column 21, Line 40, change "moveable" to --movable--.

Column 21, Line 42, change "moveable" to --movable--.

Column 21, Line 45, change "moveable" to --movable--.

Column 21, Line 48, after "of" delete "optical".

Column 21, Line 58, change "means;" to --means,--.

Column 21, Line 59, change "moveable" to --movable--.

Column 21, Line 61, change "moveable" to --movable--.

Column 21, Line 64, change "moveable" to --movable--.

Column 22, Line 10, change "means" to --means,--.

Column 22, Line 12, change "moveable" to --movable--.

Column 22, Line 14, change "moveable" to --movable--.

Column 22, Line 16, change "moveable" to --movable--.

Column 22, Line 26, change "moveable" to --movable--.

Column 22, Line 33, change "direction;" to --direction,--.

Column 22, Line 34, change "moveable" to --movable--.

Column 22, Line 36, change "moveable" to --movable--.

Column 22, Line 38, change "moveable" to --movable--.

Column 22, Line 46, after "member;" insert --and--.

UNITED STATES PATENT AND TRADEMARK OFFICE
CERTIFICATE OF CORRECTION

PATENT NO. : 6,907,154 B2
APPLICATION NO. : 09/924606
DATED : June 14, 2005
INVENTOR(S) : Yoichi Oikawa et al.

It is certified that error appears in the above-identified patent and that said Letters Patent is hereby corrected as shown below:

Column 22, Line 47, change "moveable" to --movable--.

Column 22, Line 50, change "moveable" to --movable--.

Column 22, Line 52, change "moveable" to --movable--.

Column 22, Line 56, change "moveable" to --movable--.

Column 22, Line 58, change "moveable" to --movable--.

Column 22, Line 60, change "moveable" to --movable--.

Column 23, Line 3, change "member;" to --member,--.

Column 24, Line 3, change "member;" to --member,--.

This certificate supersedes Certificates of Correction issued May 1, 2007 and August 7, 2007.

Signed and Sealed this

Thirtieth Day of October, 2007

JON W. DUDAS
*Director of the United States Patent and Trademark Office*